United States Patent
McCluskey et al.

(10) Patent No.: US 10,860,599 B2
(45) Date of Patent: Dec. 8, 2020

(54) TOOL FOR CREATING AND DEPLOYING CONFIGURABLE PIPELINES

(71) Applicant: Uptake Technologies, Inc., Chicago, IL (US)

(72) Inventors: Kyle McCluskey, Chicago, IL (US); Carlton Reid Turner, Evanston, IL (US); Birchard Hayes, Chicago, IL (US); Scott Fredrick, Palantine, IL (US); Tuan Nguyen, Chicago, IL (US)

(73) Assignee: Uptake Technologies, Inc., Chicago, IL (US)

( * ) Notice: Subject to any disclaimer, the term of this patent is extended or adjusted under 35 U.S.C. 154(b) by 234 days.

(21) Appl. No.: 16/012,591

(22) Filed: Jun. 19, 2018

(65) Prior Publication Data

US 2019/0377817 A1    Dec. 12, 2019

Related U.S. Application Data

(63) Continuation-in-part of application No. 16/004,652, filed on Jun. 11, 2018, now abandoned.

(51) Int. Cl.
*G06F 16/25* (2019.01)

(52) U.S. Cl.
CPC ........ *G06F 16/254* (2019.01); *G06F 16/258* (2019.01)

(58) Field of Classification Search
CPC ............... G06F 16/254; G06F 16/258; G06F 16/24565; G06F 16/24573; G06F 16/9535
(Continued)

(56) References Cited

U.S. PATENT DOCUMENTS 4,858,120 A * 8/1989 Samuelson ............ G06Q 10/06
                                                        705/7.25
5,566,092 A   10/1996 Wang et al.
(Continued)

FOREIGN PATENT DOCUMENTS

WO    2011117570    9/2011
WO    2013034420    3/2013
(Continued)

OTHER PUBLICATIONS

Biswas, "Redundancy-based Approaches in Wireless Multihop Network Design", PhD Dissertation Submitted to Graduate Faculty of North Carolina State University (2014).
(Continued)

*Primary Examiner* — James Trujillo
*Assistant Examiner* — Fariborz Khoshnoodi
(74) *Attorney, Agent, or Firm* — Lee Sullivan Shea & Smith LLP

(57) ABSTRACT

A computing system may provide an interface for creating a data processing pipeline through which the computing system may receive configuration information for a given pipeline that is configured to receive streaming messages from a given data source, process each of the streaming messages, and then output a processed version of at least a subset of the streaming messages to a given data sink. The given pipeline may comprise a chain of two or more operators, which may take the form of enrichers, routers, and/or transformers. The computing system may then use the received configuration information to create the given pipeline. In turn, the computing system may deploy the given pipeline for use in processing streaming messages received from the given data source.

17 Claims, 13 Drawing Sheets

(58) Field of Classification Search
USPC .................................................. 707/755, 756
See application file for complete search history.

(56) References Cited

U.S. PATENT DOCUMENTS

| | | | |
|---|---|---|---|
| 5,633,800 A | 5/1997 | Bankert et al. |
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 10,360,252 B1 | 7/2019 | Kraytem et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2006/0047798 A1* | 3/2006 | Feinleib ................... G06F 8/61 709/223 |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2009/0190533 A1* | 7/2009 | Zhu ...................... H04L 65/1006 370/328 |
| 2011/0047411 A1 | 2/2011 | Gille |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0173719 A1 | 7/2013 | Ahmed et al. |
| 2013/0219009 A1* | 8/2013 | Bheemarajaiah ....... H04L 67/26 709/217 |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0262060 A1 | 9/2015 | Husain et al. |
| 2015/0356415 A1 | 12/2015 | Sanchez et al. |
| 2016/0179063 A1 | 6/2016 | De Baynast De Septfontaines et al. |
| 2016/0239792 A1* | 8/2016 | Burch ................ G06K 19/0723 |
| 2017/0068595 A1 | 3/2017 | Nautiyal et al. |
| 2017/0262517 A1* | 9/2017 | Horowitz ............ G06F 16/2471 |
| 2017/0330081 A1 | 11/2017 | Lindsley |
| 2018/0053115 A1 | 2/2018 | Vachhani et al. |
| 2018/0365061 A1* | 12/2018 | Narsude ................ G06F 16/951 |

FOREIGN PATENT DOCUMENTS

| | | |
|---|---|---|
| WO | 2014145977 | 9/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

(56) References Cited

OTHER PUBLICATIONS

Narasimhan et al, "Combining Model-Based and Feature-Driven Diagnosis Approaches—A Case Study on Electromechanical Actuators", 21st International Workshop on Principles of Diagnosis (2010).
Prentzas et al, Categorizing Approaches Combining Rule-Based and Case-Based Reasoning.
Infor M3 Enterprise Management System, Inforcom (2014).
Infor Equipment, Infor.com (2012).
Infor Introduces Next-Generation Solution for Equipment Dealers and Service Providers, Inforcom (Feb. 20, 2014).
Infor Equipment for Rental, Infor.com (2013).
Waltermire et al, Applying the Continuous Monitoring Technical Reference Model to the Asset, Configuration, and Vulnerability Management Domains (DRAFT), NIST (Jan. 2012).
"Kafka Streams API", Apache Kafka: A Distributed Streaming Platform, kafka.apache.org/documentation/streams/, Nov. 27, 2017 (accessed via Wayback Machine https://web.archive.org/web/20171127132656/https://kafka.apache.org/documentation/streams/), 3 pages.
Pat Patterson "Create a Custom Expression Language Function for StreamSets Data Collector", streamsets.com/blog/custom-expression-language-function-streamsets-data-collector/, Apr. 28, 2017, 7 pages.
"Data Collector User Guide—Extended Tutorial", streamsets.com/documentation/datacollector/latest/help/#Tutorial/ExtendedTutorial.html#concept_w4n_git_ls, Dec. 20, 2017, 1 page.
"How to Concatenate Two Column in Talend Tmap—Stake Overflow", stackoverflow.com/questions/30913531/how-to-concatenate-two-column-in-talend-tmap, Jun. 18, 2015, 1 page.
Neha Narkhede "Introducing KSQL: Open Source Streaming SQL for Apahce Kafka", www.confluent.io/blog/ksql-open-source-streaming-sql-for-apache-kafka/, Aug. 28, 2017, 6 pages.
"NiFI 1.3+: How to Use Record Processor to Create a New Field" HCC Hortonworks Community Connection, dataworkssummit.com/abstracts/, 2011-2017, 2 pages.
"StreamSets Data Collector: Build batch and streaming pipelines in munutes." Product: StreamSets Data Collector-StreamSets, streamsets.com/products/sdc, Dec. 20, 2017, 5 pages.
Pierre Villard "Transform Data with Apache NiFi" pierrevillard.com/2016/03/09/transform-data-with-apache-nifi/, Dec. 6, 2017, 13 pages.
Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved from the Internet <URL:https://repository.lib.ncsu.edu/bitstream/handle/1840.16/9313/etd.pdf?sequence=2&isAllowed=y>.
Sermann, Rolf. Model-based Fault Detection and Diagnosis—Status and Applications. Institute of Automatic Control, Darmstadt University of Technology, Darmstadt, Germany, Jun. 2004, pp. 1-12.[online], [retrieved on Oct. 8, 2015]. Retrieved from the Internet <URL: http://citeseerx.ist.psu.edu/viewdoc/download?doi=10.1.1 .113.9295&rep=rep1&type=pdf>.
Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.
Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL:http://citeseerx.ist.psu.edu/viewdoc/download?doi=10.1.1.143.2780&rep=rep1&type=pdf>.
Infor M3 Enterprise Management System. Datasheet [online]. Infor, 2014 [retrieved May 19, 2015]. Retrieved from the Internet: <URL:www.infor.com.html>.
Infor Equipment. Datasheet [online]. Infor, 2012 [retrieved May 19, 2015]. Retrieved from the Internet<URL:www.infor.com.html>.
Infor Introduces Next-Generation Solution for Equipment Dealers and Service Providers. Infor, Feb. 2014 pp. 1-5. [online], [retrieved May 19, 2015]. Retrieved from the Internet:<URL:www.infor.com/company/news/pressroom/pressreleases/M3equipment.html>.
Infor Equipment for Rental. Datasheet [online] Infor, 2013 [retrieved May 19, 2015]. Retrieved from the Internet:<URL: www.infor.com.html>.
Waltermire et al. Applying the Continuous Monitoring Technical Reference Model to the Asset, Configuration, and Vulnerability Management Domains (DRAFT). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.
"Kafka Streams API", Apache Kafka: A Distributed Streaming Platform, kafka.apache.org/documentation/streams/, Nov. 27, 2017, 3 pages [online], [retrieved on Dec. 6, 2017]. Retrieved from the Internet <URL:https://web.archive.org/web/20171127132656/https://kafka.apache.org/documentation/streams/>.
Jatterson, Pat. Create a Custom Expression Language Function for StreamSets Data Collector. StreamSets News, Apr. 28, 2017, 7 pages [online], [retrieved on Dec. 6, 2017]. Retrieved from the Internet <URL: https://streamsets.com/blog/custom-expression-language-function-streamsets-data-collector/>.
Data Collector User Guide—Extended Tutorial. Dec. 20, 2017, 1 page. [online], [retrieved on Dec. 20, 2017]. Retrieved from the Internet <URL:https://streamsets.com/documentation/datacollector/latest/help/#Tutorial/ExtendedTutorial.html#concept_w4n_gjt_ls>.
How to Concatenate Two Column in Talend Tmap—Stake Overflow. Jun. 18, 2015, 1 page. [online], [retrieved on Dec. 6, 2017]. Retrieved from the Internet <URL:https://stackoverflow.com/questions/30913531/how-to-concatenate-two-column-in-talend-tmap>.
Narkhede, Neha. Introducing KSQL: Open Source Streaming SQL for Apahce Kafka. Aug. 28, 2017, 6 pages. [online], [retrieved on Dec. 20, 2017 ]. Retrieved from the Internet <URL:https://www.confluent.io/blog/ksql-open-source-streaming-sql-for-apache-kafka/>.
NiFI 1.3+: How to Use Record Processor to Create a New Field. HCC Hortonworks Community Connection, Sep. 26, 2018, 3 2 pages [online], [retrieved on Dec. 20, 2017]. Retrieved from the Internet <URL://https dataworkssummit.com/abstracts/>.
StreamSets Data Collector: Build batch and streaming pipelines in munutes. Product: StreamSets Data Collector-StreamSets, Dec. 20, 2017 [online], [retrieved on Dec. 20, 2017]. Retrieved from the Internet <URL:https://streamsets.com/products/sdc>.
Villard, Pierre. Transform Data with Apache NiFi. Dec. 6, 2017, 13 pages [online], [retrieved on Dec. 20, 2017]. Retrieved from the Internet <URL:https://pierrevillard.com/2016/03/09/transform-data-with-apache-nifi/>.
International Searching Authority International Search Report and Written Opinion dated Oct. 4, 2019, issued in connection with International Application No. PCT/US2019/036365, filed Jun. 10, 2019, 16 pages.

\* cited by examiner

TOOL FOR CREATING AND DEPLOYING CONFIGURABLE PIPELINES

CROSS-REFERENCE TO RELATED APPLICATIONS

This application is a continuation-in-part of, and claims priority to, U.S. Non-Provisional patent application Ser. No. 16/004,652, filed Jun. 11, 2018 and entitled "Tool for Creating and Deploying Configurable Enrichment Pipelines," which is herein incorporated by reference in its entirety.

BACKGROUND

Many industries have become more data-dependent and have invested in systems that are configured to collect raw data from various data sources, consolidate that raw data into a single data storage location (e.g., a database, data warehouse, or the like), and then make that raw data available to be accessed, analyzed, and/or applied for various purposes. As one representative example, an organization that is interested in monitoring and analyzing the operation of machines (also referred to herein as "assets") may deploy a data analytics system that is configured to receive data related to asset operation from various data sources (including the assets themselves), consolidate such asset-related data a single data storage location, and then analyze such asset-related data to learn more about the operation of the assets. This type of data analytics system may be referred to as an "asset data platform." Many other examples are possible as well.

In practice, systems such as these may employ an "Extract, Transform, and Load" (ETL) application that carries out a set of discrete operations on batches of data to assist with the process of consolidating raw data into a single data storage location. An ETL application may begin with the "extract" operation, which may extract a desired batch of data from the raw data received from a given data source. Next, the "transform" operation of the ETL application may use business rules, lookup tables, or the like to transform the extracted batch of data into a desired structure and/or format. Finally, the "load" operation of the ETL application may write the transformed batch of data to a target storage location, such as a database, a data warehouse, etc.

Overview

While ETL applications provide several benefits, these ETL applications also have several limitations. As one example, existing ETL applications currently employ "batch processing," which involves receiving and storing a larger set of data records over a period of time—referred to as a "batch" of data—and then initiating the extract, transform, and load operations on that discrete "batch" of stored data records at some later time (e.g., according to a schedule and/or after a threshold number of data records have been received and stored). In this respect, existing ETL applications generally process data on a batch-by-batch basis, which may require increased time and resources to perform each operation on the data. As a result, there is typically a delay between the time that a given data record is received and the time that the data record is ultimately processed. Further, because existing ETL applications employ batch processing, these applications typically cannot provide feedback regarding the success of the extract, transform, and load operations until those operations have been completed for an entire batch of data records, which may reduce the efficiency of ETL applications—particularly in situations where an extract, transform, and/or load operation fails due to a data record near the beginning of a given batch.

As another example, existing ETL applications are standalone programs that typically cannot be embedded into other software applications for ingesting and/or processing data, which may increase the complexity of software development efforts and also potentially lead to errors resulting from an incompatibility between separate software applications. Indeed, when a software developer chooses to develop a software application for ingesting and/or processing data that relies on a standalone ETL application, there are a number of industry best practices that will typically not be available to the software developer, including source control management, automated testing, and/or multi-engineer concurrent development.

As yet another example, existing ETL applications are typically only capable of transforming raw data into a desired structure and/or format, and do not have the capability to enrich incoming data messages with additional data fields that are appended to those data messages.

As still another example, existing ETL applications have very limited error-handling capabilities (if any)—at most, an existing ETL application may be preconfigured to perform a default error-handling action regardless of what error has occurred, when the error occurred, etc., and that default action will typically be to either stop the processing of the entire batch of data or to ignore the error altogether.

To help address one or more of these limitations, disclosed herein is a tool for creating and deploying one or more configurable pipelines that each use stream processing to receive streaming messages from a data source, perform a desired sequence of data processing operations for each streaming message, and then output each post-processed message to one or more data sinks on a substantially continuous basis (i.e., at or near real time). This tool may be referred to herein as the "pipeline configuration tool," and may generally take the form of a widget or code library that can either be integrated into other applications and/or can run alongside those other applications.

In general, each pipeline created by the disclosed tool may comprise a chain of two or more "operators," each of which comprises a module that is configured to receive a streaming data message and then perform a specified data processing operation on that message. In this respect, the disclosed operators may be categorized into different types, and each different type of operator is configured to perform a different kind of data processing operation.

For instance, a first type of operator may take the form of an "enricher," which may comprise a module that is configured to receive a streaming data message, produce and append a given type of enrichment to the data message, and then output the data message with the appended enrichment. Further, a second type of operator may take the form of a "router," which may comprise a module that is configured to receive a streaming data message, decide whether to perform a routing operation on the received message (versus whether to simply pass the received message to the next operator in the pipeline), and then handle the received message in accordance with that decision. Further yet, a third type of operator may take the form of a "transformer," which may comprise a module that is configured to receive a streaming data message, transform the message into a different form, and then output the transformed version of the message. There may be other types of operators as well.

Each operator included in a pipeline may have various configurable aspects that define the particular data processing operations to be carried out by the operator. The configurable aspects of an operator may take various forms, which may differ depending on the type of operator being configured. For instance, the configurable aspects of an enricher may include the particular enrichment operation to be performed by the enricher, the manner in which the enricher appends a produced enrichment to a message, and/or the error-handling logic carried out by the enricher, if any. Further, the configurable aspects of a router may include the routing operation to be performed by the router, the conditional logic that dictates whether to perform the routing operation for a received message, and the error-handling logic carried out by the router, if any. Further yet, the configurable aspects of a transformer may include the particular transformation operation to be performed by the transformer and the error-handling logic carried out by the transformer, if any. The configurable aspects of these operators are described in further detail below.

As noted above, a pipeline that is configured in accordance with the present disclosure may generally comprise two or more operators that are chained together (e.g., in a sequential manner). In this respect, a pipeline may be configured to receive streaming messages from a data source and output streaming messages to one or more data sinks, where the pipeline's two or more operators may be applied to each streaming message that flows through the pipeline in order to perform a desired sequence of data processing operations on each streaming message. Such a pipeline may take various forms and be configured in various manners.

At a high level, a pipeline may be configured to include any combination of two or more operators, each of which may take any of the forms described herein. Further, the two or more operators of the pipeline may be chained together in any of various different sequences. Further yet, in some embodiments, a pipeline may be configured to include a "global operation," which is a data processing operation that gets performed as a streaming message is being input into each operator in the pipeline.

In accordance with the present disclosure, it may also be possible to create a data processing configuration having two or more pipelines that are interconnected with one another. For instance, as one possibility, the pipeline configuration tool may be used to create a sequential configuration of at least two different pipelines, where a first pipeline serves as the data source for a second pipeline. As another possibility, the pipeline configuration tool may be used to create a configuration in which a given router in a first pipeline serves as the data source for a second pipeline. As yet another possibility, the pipeline creation tool may be used to create a configuration in which a given router in a first pipeline serves as the data source for multiple other pipelines, such as a second pipeline and a third pipeline. Various other data processing configurations comprised of multiple pipelines may be created as well.

In conjunction with the ability to create data processing configurations comprised of multiple pipelines, the disclosed pipeline configuration tool can also be used to break a desired sequence of data processing operations into multiple different pipelines. For instance, instead of creating and deploying a single pipeline comprised of a long sequence of data processing operations, the disclosed tool may be used to create a data processing configuration in which the data processing operations may be separated out into two or more discrete pipelines.

This ability to break a desired sequence of data processing operations into smaller, discrete pipelines may provide several advantages. First, breaking a longer sequence of data processing operations into smaller, discrete pipelines may result in a more efficient resource utilization, because a data analytics system may then have the ability to scale certain sequences of data processing operations differently than other sequences of data processing operations. Second, breaking a sequence of data processing operations into smaller, discrete pipelines may improve the process for creating a data processing configuration going forward, because these smaller, discrete pipelines can then be used as building blocks for creating a new data processing configuration (as opposed to requiring each new data processing configuration to be built from scratch). Breaking a desired sequence of data processing operations into smaller, discrete pipelines may provide other advantages as well.

After creating one or more configurable pipelines with the disclosed pipeline configuration tool, the one or more configurable pipelines may then be deployed by the data analytics system, such that a desired sequence of data process operations is carried out on a stream of data messages received from a data source.

In practice, the process of creating one or more pipelines may begin with an instance of the disclosed pipeline configuration tool being installed and run on a given computing system, such as an asset data platform. In turn, the disclosed tool may cause the computing system to provide a user (e.g., an individual tasked with setting up the ingestion of data sources into a data platform) with an interface that enables the user to create and request deployment of one or more pipelines for a given data source, such as an asset. This interface for the disclosed tool may take various forms, examples of which may include a graphical user interface (GUI) that is more targeted for everyday users of the platform (i.e., customers) and a command-line-type interface that is more targeted to advanced users. In either case, the interface for the disclosed tool may provide a user with the ability to input configuration information for an enrichment pipeline, including information that specifies a data source for the pipeline, a data sink for the pipeline, the two or more operators to be included in the pipeline, and the manner in which the two or more operators are to be chained together, among other information.

While providing the interface for the disclosed tool to a user, the computing system may receive configuration information for a pipeline being created, which may take various forms. In one implementation, the configuration information for an enrichment pipeline may include a selection of a data source for the pipeline, a selection of the data sink for the pipeline, configuration information for each operator to be included in the pipeline, and configuration information specifying how to chain the two or more operators together. In line with the discussion above, the configuration information for each operator in the pipeline may take various forms, examples of which may include information defining the type of operator, the particular data processing operation to be performed by the operator, and the error-handling logic to be carried out by an operator, if any. The configuration information for each operator may take other forms as well.

The computing system may then use the configuration information to create the new pipeline, which may involve compiling the configuration information (e.g., by assembling and/or transforming the configuration information into a data structure that defines the pipeline). For instance, in one implementation, the computing system may compile the configuration information into a set of configuration files that each define a respective operator within the pipeline, and thus collectively define the pipeline. In another implementation, the computing system may compile the configuration information into a single file that defines the pipeline. The computing system may compile the configuration information in other manners as well.

In turn, the computing system may deploy the pipeline such that it is applied to new streaming data received from a given data source. Once the pipeline is deployed, the computing system may run the pipeline in a substantially continuous manner on streaming messages received from the given data source, which may involve applying the pipeline's sequence of data processing operations to the streaming messages received from the data source on a message-by-message basis and then outputting processed versions of the streaming messages to one or more data sinks.

The disclosed pipeline configuration tool may thus provide several advantages over existing ETL applications (or the like) that are employed by data platforms to extract, transform, and load raw data that is received from a data source. First, the disclosed tool uses stream processing to receive, process, and output data messages in a substantially continuous manner (i.e., on a message-by-message basis), which may be more efficient than the batch processing approach used by existing ETL applications. Second, the disclosed tool may take the form of a widget or library that can be embedded into another application, which may avoid the drawbacks of integrating with a standalone ETL application. Third, the disclosed tool may allow for the creation and deployment of processing operations in a data ingestion application that are not available in existing ETL applications, including the execution of data processing operations and error-handling logic on a message-by-message basis. Fourth, the disclosed tool may allow a sequence of data process operations to be broken into separate, modular pipelines, which may allow for the data processing operations to be carried out more efficiently. It should be understood that these advantages are merely exemplary, and that the disclosed tool may provide various other advantages as well.

Accordingly, in one aspect, disclosed herein is a computer-implemented method that involves (a) providing an interface for creating a data processing pipeline, (b) via the interface, receiving configuration information for a given pipeline that is configured to receive streaming messages from a given data source, process each of the streaming messages, and then output a processed version of at least a subset of the streaming messages to a given data sink, where the given pipeline comprises a chain of two or more operators, (c) compiling the received configuration information and thereby creating the given pipeline, and (d) deploying the given pipeline for use in processing streaming messages received from the given data source.

In another aspect, disclosed herein is a computing system comprising a network interface configured to facilitate communication with at least one data source, at least one processor, a tangible non-transitory computer-readable medium, and program instructions stored on the tangible non-transitory computer-readable medium that are executable by the at least one processor to cause the computing system to carry out functions associated with the computer-implemented method above.

In yet another aspect, disclosed herein is a non-transitory computer-readable medium having instructions stored thereon that are executable to cause a computing system to carry out functions associated with the computer-implemented method above.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
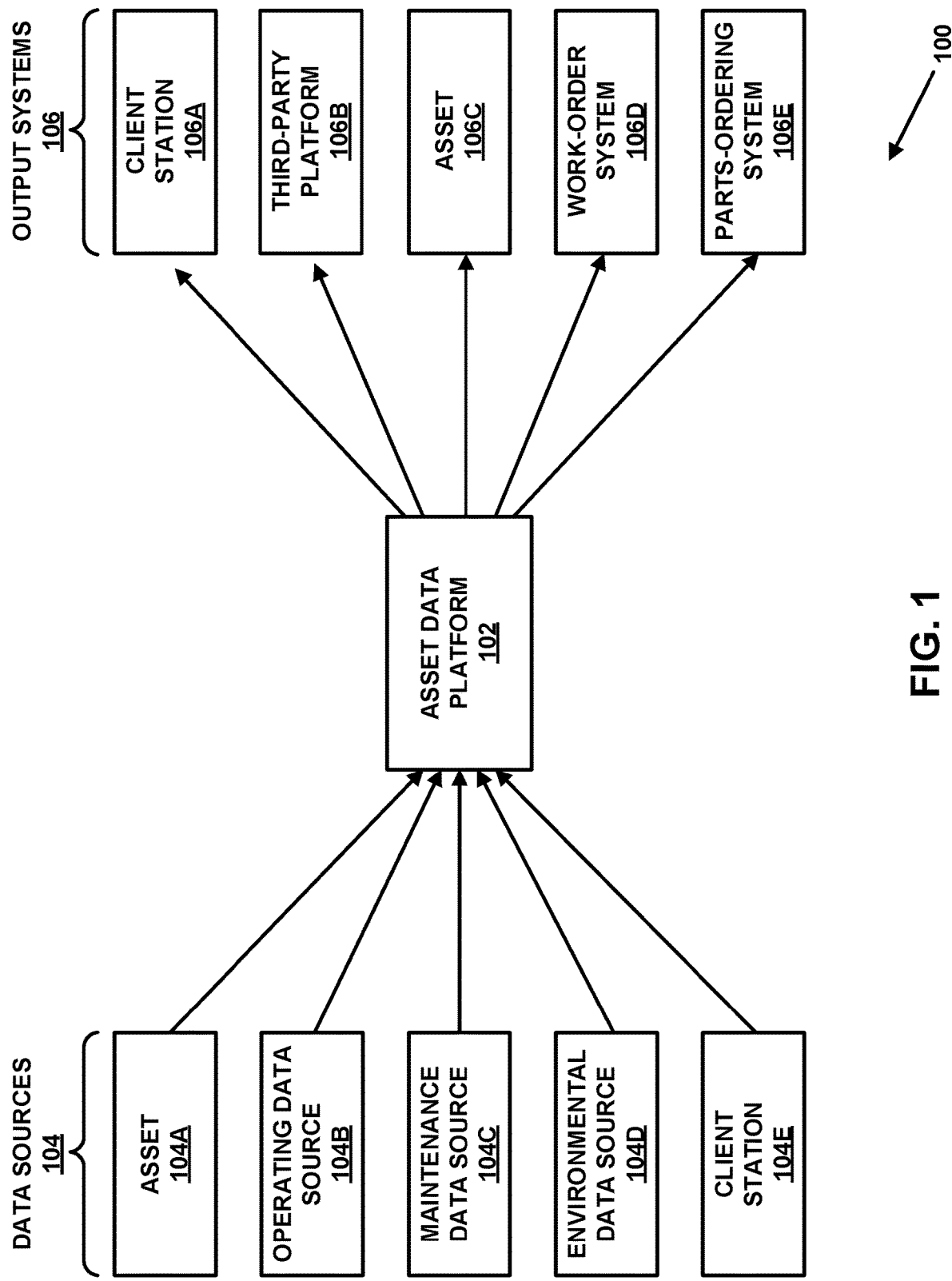
FIG. 1 depicts an example network configuration in which example embodiments may be implemented.

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" that is configured to perform functions to facilitate the monitoring, analysis, and/or management of various types of "assets," which may take various forms.

For instance, some representative types of assets that may be monitored by asset data platform 102 may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "fleets" of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation and/or management of assets (broadly referred to herein as "asset-related data") from data sources 104, performing data ingestion and/or data analytics operations on the asset-related data received from asset data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such include Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure prediction, anomaly detection, fuel management, noise filtering, image analysis, predictive recommendations, and label correction, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include an asset performance management application, an asset fleet management application, a service optimization application, and an asset dealer operations application, among other possibilities.

The software for carrying out the disclosed platform functions may take various other forms as well.

As described above, asset data platform 102 may be configured to receive asset-related data from one or more data sources 104. These data sources—and the asset-related data output by such data sources—may take various forms. To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset—referred to herein as "operating data"—and then transmit the asset's operating data to asset data platform 102 over the respective communication path between asset 104A and asset data platform 102. In this respect, asset 104A may take any of the various forms described above, including but not limited to a transport vehicle, heavy equipment, manufacturing equipment, electric power generation equipment, and/or petroleum production equipment, among other types of assets. Further, it should be understood that the components of asset 104A for capturing and transmitting the asset's operating data either may be included as part of asset 104A as manufactured or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A (e.g., in the form of streaming data messages). As yet another possibility, asset data platform 102 may receive operating data from asset 104A in response to sending a request for such data to asset 104A, in which case asset data platform 102 may be configured to periodically send requests for operating data to asset 104A. Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a fleet of assets (e.g., at a job site or wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets—referred to herein as "maintenance data"—and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in tracking the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 102 may be configured to receive operating data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate—referred to herein as "environmental data"—and then send this data to asset data platform 102 over the respective communication path between environmental data source 104D and asset data platform 102. In this respect, environmental data source 104D—and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. As still another possibility, environmental data source 104D may take the form of a traffic data source that provides information regarding ground, air, and/or water traffic at locations where assets operate. Environmental data source 104D may take other forms as well.

Further, in practice, asset data platform 102 may be configured to receive operating data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a fleet operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both an operating data source 104B and an asset maintenance data source 104C). Further yet, it should be understood that asset data platform 102 may be configured to receive other types of data related to the operation and/or management of assets as well, examples of which may include asset management data (e.g., route schedules and/or operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via a front-end application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., predicted failures, recommendations, alerts, etc.). Other examples are possible as well.

Along with the asset-related data that is output for receipt by client station 106A, asset data platform 102 may also output associated data and/or instructions that define the visual appearance of a front-end application (e.g., a graphical user interface (GUI)) through which the asset-related data is to be presented on client station 106A. Such data and/or instructions for defining the visual appearance of a front-end application may take various forms, examples of which may include Hypertext Markup Language (HTML), Cascading Syle Sheets (CSS), and/or JavaScript, among other possibilities. However, depending on the circumstance, it is also possible that asset data platform 102 may output asset-related data to client station 106A without any associated data and/or instructions for defining the visual appearance of a front-end application.

Further, client station 106A may receive asset-related data from asset data platform 102 in various manners. As one possibility, client station 106A may send a request to asset data platform 102 for certain asset-related data and/or a certain front-end application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a data platform 106B operated by a third-party organization that interested in the operation and/or management of assets, such as an asset owner, an asset dealer, an asset manufacturer, an asset repair shop, or the like. For instance, a third-party organization such as this may have its own data platform 106B that already enables users to access and/or interact with asset-related data through front-end applications that have been created by the third-party organization, but data platform 106B may not be programmed with the capability to ingest certain types of asset-related data or perform certain types of data analytics operations. In such a scenario, asset data platform 102 may be configured to output certain asset-related data for receipt by data platform 106B.

The asset-related data that is output for receipt by data platform 106B may take various forms, including but not limited any of the forms described above in connection with the output to client station 106A. However, unlike for client station 104A, the asset-related data that is output for receipt by data platform 106B typically need not include any associated data and/or instructions for defining the visual appearance of a front-end application, because data platform 106B may be performing operations on the asset-related data from asset data platform 102 beyond presenting it to a user via a front-end application.

Further, data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C, which may be equipped with components that are configured to receive asset-related data and/or instructions from asset data platform 102 and then act in accordance with the received data and/or instructions. In this respect, asset 106B may take any of the various forms described above, including but not limited to a transport vehicle, heavy equipment, manufacturing equipment, electric power generation equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., predicted failures, recommendations, alerts, etc.), in which case asset 106B may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction. As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well.

Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to asset-related data and/or instructions for receipt by as little as a single output system 106. Further, while output systems 106A-D have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
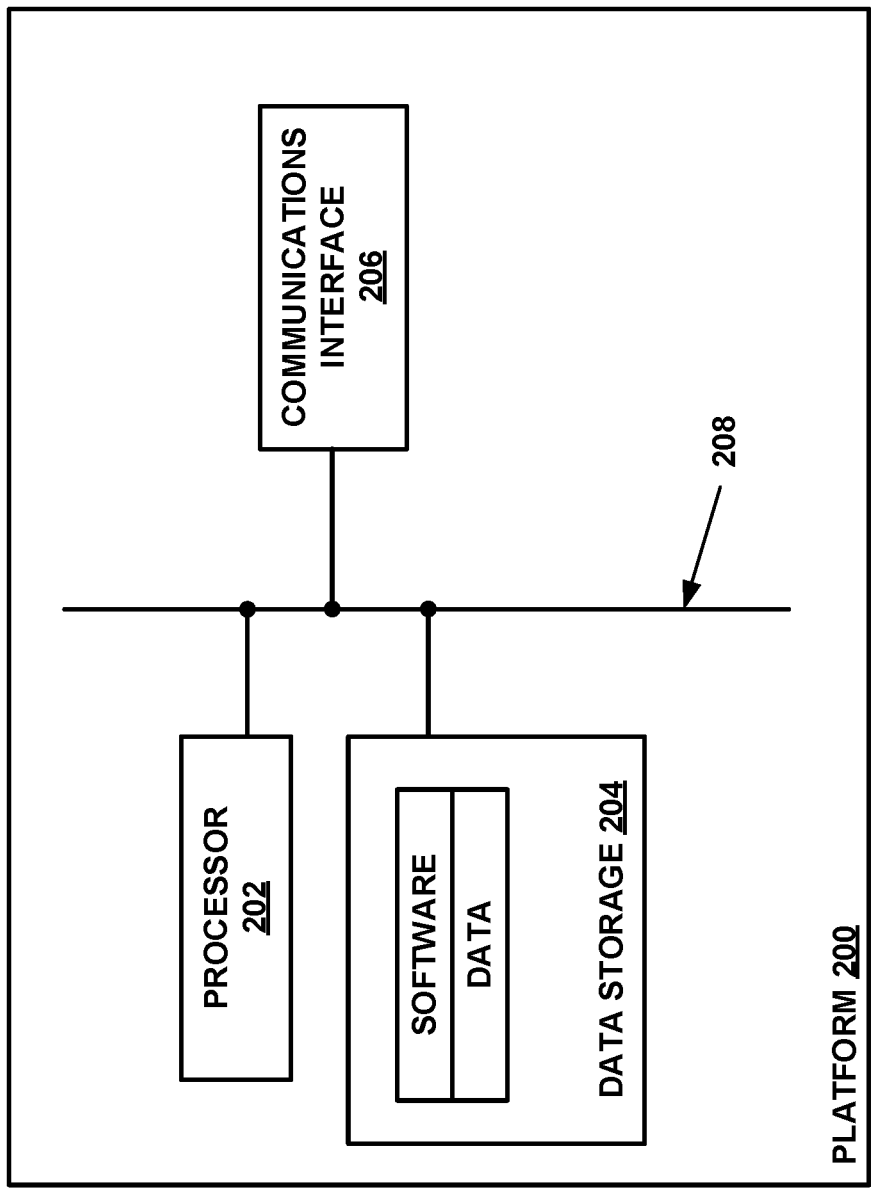
FIG. 2 depicts a simplified block diagram of an example asset data platform from a structural perspective.

FIG. 2 is a simplified block diagram illustrating some structural components that may be included in an example computing platform 200, which could serve as the asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2, data storage 204 may be provisioned with software components that enable the platform 200 to carry out the functions disclosed herein. These software components may generally take the form of program instructions that are executable by the processor 202 to carry out the disclosed functions, which may be arranged together into software applications, virtual machines, software development kits, toolsets, or the like.

Further, data storage 204 may be arranged to store asset-related data in one or more databases, file systems, or the like. For example, data storage 204 may be configured to store data using technologies such Apache Cassandra, Apache Hadoop, PostgreSQL, and/or MongoDB, among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

Figure 3:
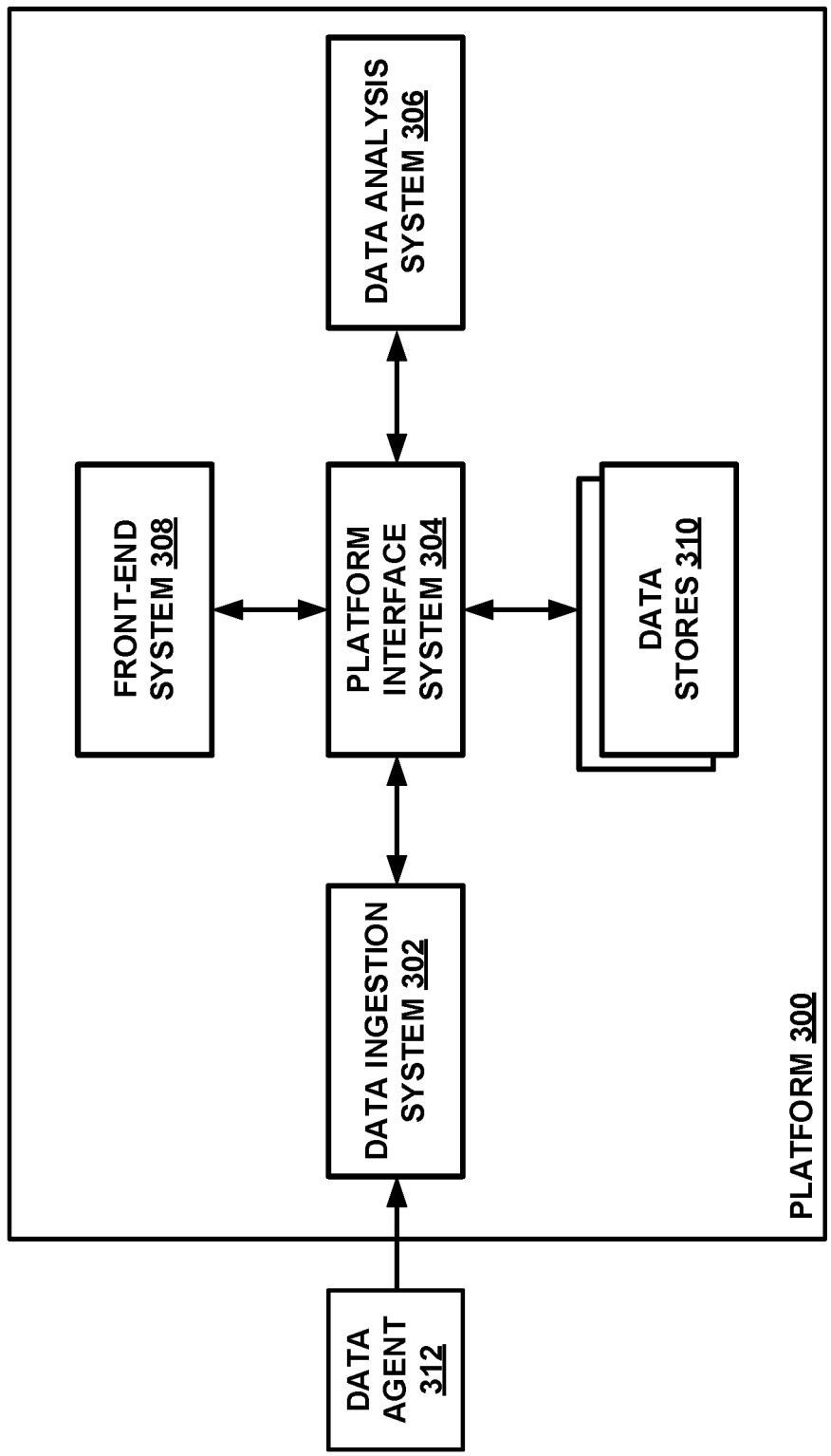
FIG. 3 depicts a simplified block diagram of an example asset data platform from a functional perspective.

Referring now to FIG. 3, another simplified block diagram is provided to illustrate some functional systems that may be included in an example platform 300. For instance, as shown, the example platform 300 may include a data ingestion system 302, a platform interface system 304, a data analysis system 306, a front-end system 308, and one or more data stores 310, each of which comprises a combination of software and hardware that is configured to carry out particular functions. In line with the discussion above, these functional systems may be implemented on one or more computing systems, which may take the form of computing infrastructure of a public, private, and/or hybrid cloud or one or more dedicated servers, among other possibilities.

At a high level, data ingestion system 302 may be configured to ingest asset-related data received from the platform's one or more data sources, transform the ingested data into a standardized structure, and then pass the ingested data to platform interface system 304. In this respect, the function of ingesting received data may be referred to as the "extraction" (or "acquisition") stage within data ingestion system 302, the function of transforming the ingested data into a desired structure may be referred to as the "transformation" stage within data ingestion system 302, and the function of passing the ingested data to platform interface system 304 may be referred to as the "load" stage within data ingestion system 302. (Alternatively, these functions may collectively be referred to as the ETL stage). In some embodiments, data ingestion system 302 may also be configured to enhance the ingested data before passing it to platform interface system 304. This function of enhancing the ingested data may be referred to as the "enhancement" stage within data ingestion system 302. However, data ingestion system 302 may take various other forms and perform various other functions as well.

At the extraction stage, data ingestion system 302 may be configured to receive and ingest various types of asset-related data from various types of data sources, including but not limited to the types of asset-related data and data sources 104 discussed above with reference to FIG. 1. Further, in line with the discussion above, data ingestion system 302 may be configured to receive asset-related data from a data source in various manners. For instance, one possibility, data ingestion system 302 may be configured to receive batch transmissions of asset-related data from a data source. As another possibility, data ingestion system 302 may be configured to receive asset-related data from a data source in a streaming fashion. As yet another possibility, data ingestion system 302 may be configured to receive asset-related data from a data source in response to sending a request for such data to the data source, in which case data ingestion system 302 may be configured to periodically send requests for asset-related data to the data source. As still another possibility, data ingestion system 302 may receive asset-related data from a data source by subscribing to a service provided by the data source (e.g., via an API or the like). Data ingestion system 302 may be configured to receive asset-related data from a data source in other manners as well.

Before data ingestion system 302 receives asset-related data from certain data sources, there may also be some configuration that needs to place at such data sources. For example, a data source may be configured to output the particular set of asset-related data that is of interest to platform 300. To assist with this process, the data source may be provisioned with a data agent 312, which generally comprises a software component that functions to access asset-related data at the given data source, place the data in the appropriate format, and then facilitate the transmission of that data to platform 300 for receipt by data ingestion system 302. In other cases, however, the data sources may be capable of accessing, formatting, and transmitting asset-related data to platform 300 without the assistance of a data agent.

Turning to the transformation phase, data ingestion system 302 may generally be configured to map and transform ingested data into one or more predefined data structures, referred to as "schemas," in order to standardize the ingested data. As part of this transformation stage, data ingestion system 302 may also drop any data that cannot be mapped to a schema.

In general, a schema is an enforceable set of rules that define the manner in which data is to be structured in a given system, such as a data platform, a data store, etc. For example, a schema may define a data structure comprising an ordered set of data fields that each have a respective field identifier (e.g., a name) and a set of parameters related to the field's value (e.g., a data type, a unit of measure, etc.). In such an example, the ingested data may be thought of as a sequence of data records, where each respective data record includes a respective snapshot of values for the defined set of fields. The purpose of a schema is to define a clear contract between systems to help maintain data quality, which indicates the degree to which data is consistent and semantically correct.

In some implementations, data ingestion system 302 may also be configured to map and transform different types of asset-related to different schemas. For instance, if the asset-related data received from different data sources is to be input into different types of data analytics operations that have different input formats, it may be advantageous to map and transform such asset-related data received from the different data sources to different schemas.

As part of the transformation stage, data ingestion system 302 may also be configured to perform various other quality checks on the asset-related data before passing it to platform interface system 304. For example, data ingestion system 302 may assess the reliability (or "health") of certain ingested data and take certain actions based on this reliability, such as dropping any unreliable data. As another example, data ingestion system 302 may "de-dup" certain ingested data by comparing it against data that has already been received by platform 300 and then ignoring or dropping duplicative data. As yet another example, data ingestion system 302 may determine that certain ingested data is related to data already stored in the platform's data stores (e.g., a different version of the same data) and then merge the ingested data and stored data together into one data structure or record. Data ingestion system 302 may perform other types of quality checks as well.

It should also be understood that certain data ingested by data ingestion system 302 may not be transformed to a predefined schema (i.e., it is possible that certain ingested data will be "passed through" without performing any transformation on the data), in which case platform 300 may operate on this ingested data as it exists in its original data structure.

As noted above, in some embodiments, data ingestion system 302 may also include an "enhancement" stage where data ingestion system 302 enhances the ingested data before passing it to platform interface system 304. In this respect, data ingestion system 302 may enhance the ingested data in various manners. For instance, data ingestion system 302 may supplement the ingested data with additional asset-related data that is derived by and/or otherwise accessible to platform 300. Such additional data may take various forms. As one example, if the ingested data comprises sensor data, data ingestion system 302 may be configured to supplement the sensor data with "roll-up" data and/or "features" data that is derived from the sensor data. As another possible example, data ingestion system 302 may generate and append certain "enrichments" to the ingested data, which is discussed in further detail below. Data ingestion system 302 may enhance the ingested data in other manners as well.

After data ingestion system 302 has performed any appropriate transformation and/or enhancement operations on the ingested data, it may pass the ingested data to platform interface system 304, which may be configured to receive data from data ingestion system 302, store the received data in one or more of data stores 310, and make the data available for consumption by the other functional systems of platform 300—including data analysis system 306 and/or front-end system 308. In this respect, the function of passing the ingested data from data ingestion system 302 to platform interface system 304 may take various forms.

According to an example implementation, data ingestion system 302 may begin by categorizing the ingested data into separate data categories (or "domains") that are to be consumed separately by the platform's other functional systems. In turn, data ingestion system 302 may publish the data within each category to a corresponding interface (e.g., an API or the like) that is provided by platform interface system 304. However, it should be understood that other approaches for passing the ingested data from data ingestion system 302 to platform interface system 304 may be used as well, including the possibility that data ingestion system 302 may simply publish the ingested data to a given interface of platform interface system 304 without any prior categorization of the ingested data.

After platform interface system 304 receives the ingested data from data ingestion system 302, platform interface system 304 may cause that data to be stored at the appropriate data stores 310 within platform 300. For instance, in the event that platform interface system 304 is configured to receive different categories of ingested data, platform interface system 304 may be configured store data from a first category into a first data store 310, store data from a second category into a second data store 310, and so on. In addition, platform interface system 304 may store an archival copy of the ingested data into an archival data store 310. Platform interface system 304 may store the ingested data in other manners as well.

After receiving the ingested data from data ingestion system 302, platform interface system 304 may also make the ingested data available for consumption by the platform's other functional systems—including data analysis system 306 and front-end system 308. In this respect, platform interface system 304 may make the ingested available for consumption in various manners, including through the use of message queues or the like.

After consuming data from platform interface system 304, data analysis system 306 may generally function to perform data analytics operations on such data and then pass the results of those data analytics operations back to platform interface system 304. These data analytics operations performed by data analysis system 306 may take various forms.

As one possibility, data analysis system 306 may create and/or execute predictive models related to asset operation based on asset-related data received from one or more data sources, such as predictive models that are configured to predict occurrences of failures at an asset. One example of a predictive model that may be created and executed by data analysis system 306 is described in U.S. application Ser. No. 14/732,258, which is incorporated by reference herein in its entirety.

As another possibility, data analysis system 306 may create and/or execute models for detecting anomalies in asset-related data received from one or more data sources. Some examples of anomaly detection models that may be created and executed by data analysis system 306 are described in U.S. application Ser. Nos. 15/367,012 and 15/788,622, which are incorporated by reference herein in their entirety.

As yet another possibility, data analysis system 306 may be configured to create and/or execute other types of data analytics programs based on asset-related data received from one or more data sources, examples of which include data analytics programs that evaluate asset-related data using a set of predefined rules (e.g., threshold-based rules), data analytics programs that generate predictive recommendations, data analytics programs that perform noise filtering, and data analytics programs that perform image analysis, among other possibilities.

The data analytics operations performed by data analysis system 306 may take various other forms as well.

Further, it should be understood that some of the data analytics operations discussed above may involve the use of machine learning techniques, examples of which may include regression, random forest, support vector machines (SVM), artificial neural networks, Naïve Bayes, decision trees, dimensionality reduction, k-nearest neighbor (kNN), gradient boosting, clustering, and association, among other possibilities.

As discussed above, after performing its data analytics operations, data analysis system 306 may then pass the results of those operations back to platform interface system 304, which may store the results in the appropriate data store 310 and make such results available for consumption by the platform's other functional systems—including data analysis system 306 and front-end system 308.

In turn, front-end system 308 may generally be configured to drive front-end applications that may be presented to a user via a client station (e.g., client station 106A). Such front-end applications may take various forms. For instance, as discussed above, some possible front-end applications for platform 300 may include an asset performance management application, an asset fleet management application, a service optimization application, and/or an asset dealer operations application, among other possibilities.

In practice, front-end system 308 may generally function to access certain asset-related data from platform interface system 304 that is to be presented to a user as part of a front-end application and then provide such data to the client station along with associated data and/or instructions that define the visual appearance of the front-end application. Additionally, front-end system 308 may function to receive user input that is related to the front-end applications for platform 300, such as user requests and/or user data. Additionally yet, front-end system 308 may support a software development kit (SDK) or the like that allows a user to create customized front-end applications for platform 300. Front-end system 308 may perform other functions as well.

Platform 300 may also include other functional systems that are not shown. For instance, although not shown, platform 300 may include one or more additional functional systems that are configured to output asset-related data and/or instructions for receipt by other output systems, such as third-party data platforms, assets, work-order systems, parts-ordering systems, or the like.

One of ordinary skill in the art will appreciate that the example platform shown in FIGS. 2-3 is but one example of a simplified representation of the structural components and/or functional systems that may be included in a platform, and that numerous others are also possible. For instance, other platforms may include structural components and/or functional systems not pictured and/or more or less of the pictured structural components and/or functional systems. Moreover, a given platform may include multiple, individual platforms that are operated in concert to perform the operations of the given platform. Other examples are also possible.

III. EXAMPLE ASSET

As discussed above with reference to FIG. 1, asset data platform 102 may be configured to perform functions to facilitate the monitoring, analysis, and/or management of various types of assets, examples of which may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples.

Broadly speaking, an asset may comprise a combination of one or more electrical, mechanical, electromechanical, and/or electronic components that are designed to perform one or more tasks. Depending on the type of asset, such components may take various forms. For instance, a transport vehicle may include an engine, a transmission, a drivetrain, a fuel system, a battery system, an exhaust system, a braking system, a generator, a gear box, a rotor, and/or hydraulic systems, which work together to carry out the tasks of a transport vehicle. However, other types of assets may include other various other types of components.

Figure 4:
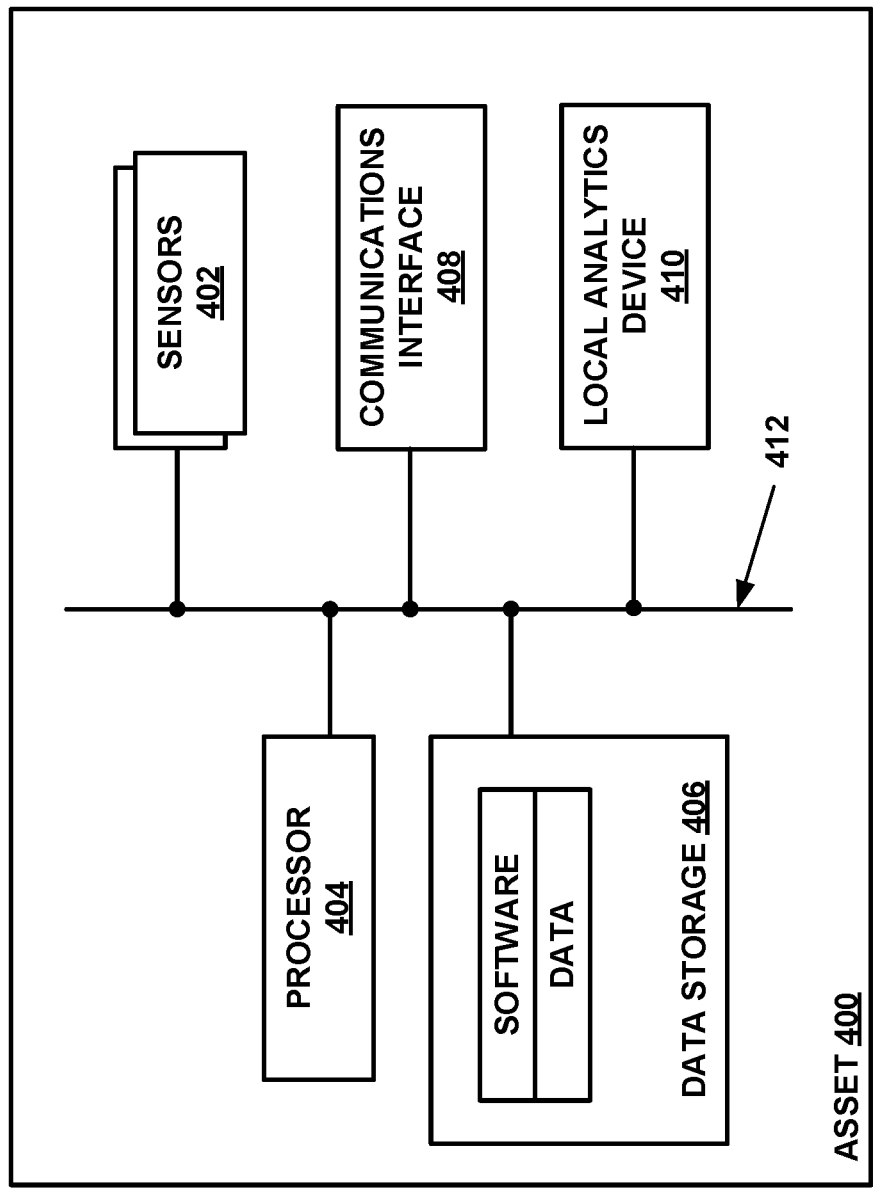
FIG. 4 depicts a simplified block diagram of the on-board components of an example asset.

In addition to the aforementioned components, an asset may also be equipped with a set of on-board components that enable the asset to capture and report operating data. To illustrate, FIG. 4 is simplified block diagram showing some on-board components for capturing and reporting operating data that may be included within or otherwise affixed to an example asset 400. As shown, these on-board components may include sensors 402, a processor 404, data storage 406, a communication interface 408, and perhaps also a local analytics device 410, all of which may be communicatively coupled by a communication link 412 that may take the form of a system bus, a network, or other connection mechanism.

In general, sensors 402 may each be configured to measure the value of a respective operating parameter of asset 400 and then output data that indicates the measured value of the respective operating parameter over time. In this respect, the operating parameters of asset 400 that are measured by sensors 402 may vary depending on the type of asset, but some representative examples may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others.

In practice, sensors 402 may each be configured to measure the value of a respective operating parameter continuously, periodically (e.g., based on a sampling frequency), and/or in response to some triggering event. In this respect, each sensor 402 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 402 may each be configured to output data that indicates the measured value of its respective operating parameter continuously, periodically (e.g., based on a sampling frequency), and/or in response to some triggering event.

Based on the foregoing, it will be appreciated that sensors 402 may take various different forms depending on the type of asset, the type of operating parameter being measured, etc. For instance, in some cases, a sensor 402 may take the form of a general-purpose sensing device that has been programmed to measure a particular type of operating parameter. In other cases, a sensor 402 may take the form of a special-purpose sensing device that has been specifically designed to measure a particular type of operating parameter (e.g., a temperature sensor, a GPS receiver, etc.). In still other cases, a sensor 402 may take the form of a special-purpose device that is not primary designed to operate as a sensor but nevertheless has the capability to measure the value of an operating parameter as well (e.g., an actuator). Sensors 402 may take other forms as well.

Processor 404 may comprise one or more processor components, such as general-purpose processors, special-purpose processors, programmable logic devices, controllers, and/or any other processor components now known or later developed. In turn, data storage 406 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 4, data storage 406 may be arranged to contain executable program instructions (i.e., software) that cause asset 400 to perform various functions related to capturing and reporting operating data, along with associated data that enables asset 400 to perform these operations. For example, data storage 406 may contain executable program instructions that cause asset 400 to obtain sensor data from sensors 402 and then transmit that sensor data to another computing system (e.g., asset data platform 102). As another example, data storage 406 may contain executable program instructions that cause asset 400 to evaluate whether the sensor data output by sensors 402 is indicative of any abnormal conditions at asset 400 (e.g., by applying logic such as threshold-based rules to the measured values output by sensors 402), and then if so, to generate abnormal-condition data that indicates occurrences of abnormal conditions. The executable program instructions and associated data stored in data storage 406 may take various other forms as well.

Communication interface 408 may be configured to facilitate wireless and/or wired communication between asset 400 and various computing systems, including an asset data platform such as asset data platform 102. As such, communication interface 408 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 408 may also include multiple communication interfaces of different types. Other configurations are possible as well. It should also be understood that asset 400 may not be equipped with its own on-board communication interface.

In some circumstances, it may also be desirable to perform certain data analytics operations locally at asset 400, rather than relying on a central platform to perform data analytics operations. Indeed, performing data analytics operations locally at asset 400 may reduce the need to transmit operating data to a centralized platform, which may reduce the cost and/or delay associated with performing data analytics operations at the central platform and potentially also increase the accuracy of certain data analytics operations, among other advantages.

In this respect, in some cases, the aforementioned on-board components of asset 400 (e.g., processor 404 and data storage 406) may provide sufficient computing power to locally perform data analytics operations at asset 400, in which case data storage 406 may be provisioned with executable program instructions and associated program data for performing the data analytics operations. However, in other cases, the aforementioned on-board components of asset 400 (e.g., processor 404 and/or data storage 406) may not provide sufficient computing power to locally perform certain data analytics operations at asset 400. In such cases, asset 400 may also optionally be equipped with local analytics device 410, which may comprise a computing device that is capable of performing data analytics operations and other complex operations that go beyond the capabilities of the asset's other on-board components. In this way, local analytics device 410 may generally serve to expand the on-board capabilities of asset 400.

Figure 5:
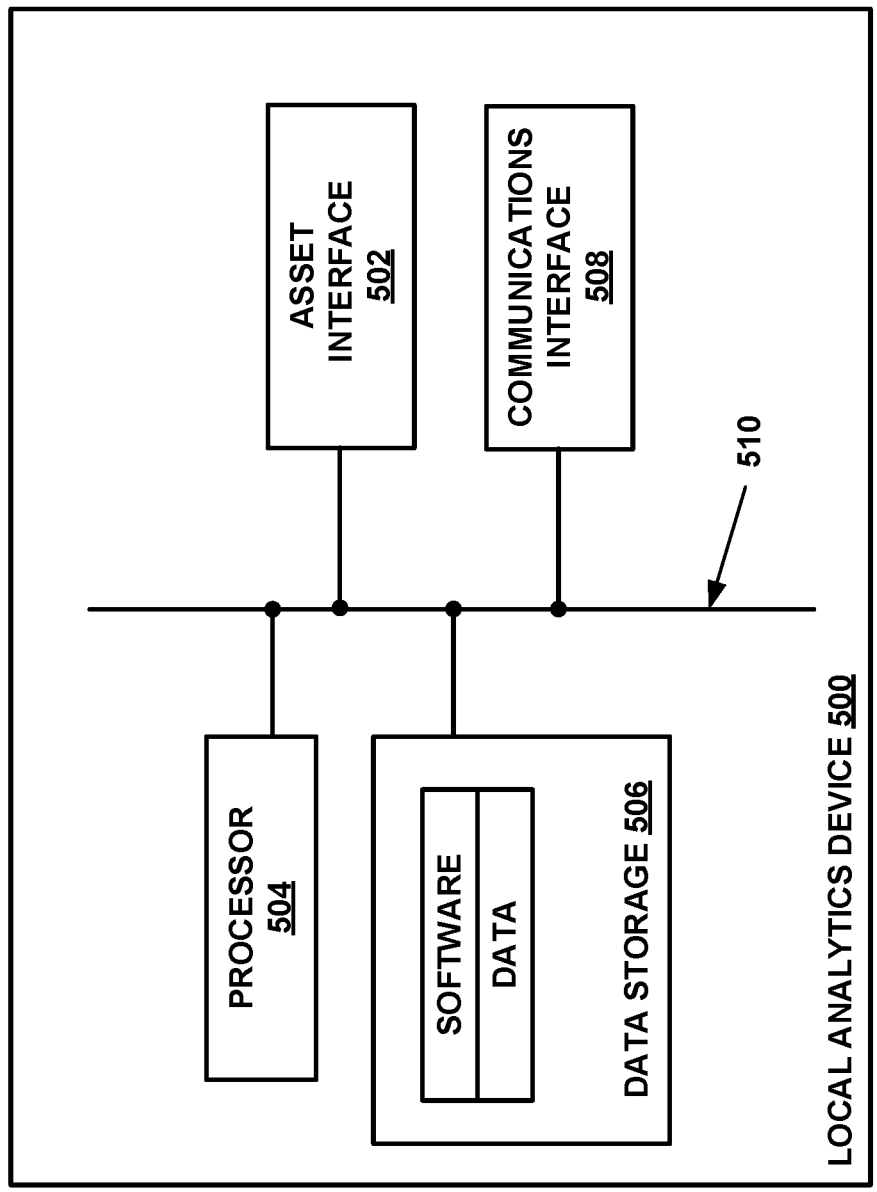
FIG. 5 depicts a simplified block diagram of an example local analytics device.

FIG. 5 a simplified block diagram showing some components that may be included in an example local analytics device 500. As shown, local analytics device 500 may include an asset interface 502, a processor 504, data storage 506, and a communication interface 508, all of which may be communicatively coupled by a communication link 510 that may take the form of a system bus, a network, or other connection mechanism.

Asset interface 502 may be configured to couple local analytics device 500 to the other on-board components of asset 400. For instance, asset interface 502 may couple local analytics device 500 to processor 404, which may enable local analytics device 500 to receive data from processor 404 (e.g., sensor data output by sensors 402) and to provide instructions to processor 404 (e.g., to control the operation of asset 400). In this way, local analytics device 500 may indirectly interface with and receive data from other on-board components of asset 400 via processor 404. Additionally or alternatively, asset interface 502 may directly couple local analytics device 500 to one or more sensors 402 of asset 400. Local analytics device 500 may interface with the other on-board components of asset 400 in other manners as well.

Processor 504 may comprise one or more processor components that enable local analytics device 500 to execute data analytics programs and/or other complex operations, which may take the form of general-purpose processors, special-purpose processors, programmable logic devices, controllers, and/or any other processor components now known or later developed. In turn, data storage 506 may comprise one or more non-transitory computer-readable storage mediums that enable local analytics device 500 to execute data analytics programs and/or other complex operations, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 5, data storage 506 may be arranged to contain executable program instructions (i.e., software) that cause local analytics device 500 to perform data analytics operations and/or other complex operations that go beyond the capabilities of the asset's other on-board components, as well as associated data that enables local analytics device 500 to perform these operations.

Communication interface 508 may be configured to facilitate wireless and/or wired communication between local analytics device 500 and various computing systems, including an asset data platform such as asset data platform 102. In this respect, local analytics device 500 may communicate the results of its operations to an asset data platform via communication interface 508, rather than via an on-board communication interface of asset 400. Further, in circumstances where asset 400 is not be equipped with its own on-board communication interface, asset 400 may use communication interface 508 to transmit operating data to an asset data platform. As such, communication interface 508 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 508 may also include multiple communication interfaces of different types. Other configurations are possible as well.

In addition to the foregoing, local analytics device 500 may also include other components that can be used to expand the on-board capabilities of an asset. For example, local analytics device 500 may optionally include one or more sensors that are configured to measure certain parameters, which may be used to supplement the sensor data captured by the asset's on-board sensors. Local analytics device 500 may include other types of components as well.

Returning to FIG. 4, although not shown, asset 400 may also be equipped with hardware and/or software components that enable asset 400 to adjust its operation based on asset-related data and/or instructions that are received at asset 400 (e.g., from asset data platform 102 and/or local analytics device 410). For instance, as one possibility, asset 400 may be equipped with one or more of an actuator, motor, valve, solenoid, or the like, which may be configured to alter the physical operation of asset 400 in some manner based on commands received from processor 404. In this respect, data storage 406 may additionally be provisioned with executable program instructions that cause processor 404 to generate such commands based on asset-related data and/or instructions received via communication interface 408. Asset 400 may be capable of adjusting its operation in other manners as well.

Further, although not shown, asset 400 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the on-board components of asset 400.

One of ordinary skill in the art will appreciate that FIGS. 4-5 merely shows one example of the components of an asset, and that numerous other examples are also possible. For instance, the components of an asset may include additional components not pictured, may have more or less of the pictured components, and/or the aforementioned components may be arranged and/or integrated in a different manner. Further, one of ordinary skill in the art will appreciate that two or more of the components of asset 400 may be integrated together in whole or in part. Further yet, one of ordinary skill in the art will appreciate that at least some of these components of asset 400 may be affixed or otherwise added to asset 400 after it has been placed into operation.

IV. EXAMPLE OPERATIONS

As noted above, disclosed herein is a tool for creating and deploying one or more configurable pipelines that each use stream processing to receive streaming messages from a data source, perform a desired sequence of data processing operations for each streaming message, and then output each post-processed message to one or more data sinks on a substantially continuous basis (i.e., at or near real time). This tool may be referred to herein as a "pipeline configuration tool," and may generally take the form of an application such as a widget or code library that can either be integrated into other applications and/or can run alongside those other applications.

In general, each pipeline created by the disclosed tool may comprise a chain of two or more "operators," each of which comprises a module that is configured to receive a streaming data message and then perform a specified data processing operation on that message. In this respect, the disclosed operators may be categorized into different types, and each different type of operator is configured to perform a different kind of data processing operation.

For instance, a first type of operator may take the form of an "enricher," which may comprise a module that is configured to receive a streaming data message, produce and append a given type of enrichment to the data message, and then output the data message with the appended enrichment. Further, a second type of operator may take the form of a "router," which may comprise a module that is configured to receive a streaming data message, decide whether to perform a routing operation on the received message (versus whether to simply pass the received message to the next operator in the pipeline), and then handle the received message in accordance with that decision. Further yet, a third type of operator may take the form of a "transformation" operator, which may comprise a module that is configured to receive a streaming data message, transform the message into a different form, and then output the transformed version of the message. There may be other types of operators as well.

Each operator included in a pipeline may have various configurable aspects that define the particular data processing operations to be carried out by the operator. The configurable aspects of an operator may take various forms, which may differ depending on the type of operator being configured.

For instance, as noted above, an enricher may generally be configured to receive a streaming data message, produce and append a given type of enrichment to the data message, and then output the data message with the appended enrichment. In line with this general configuration, the configurable aspects of an enricher may include (1) the particular enrichment operation to be performed by the enricher, (2) the manner in which the enricher appends a produced enrichment to a message, and/or (3) the error-handling logic carried out by the enricher, if any. Each of these configurable aspects of an enricher will now be described in further detail below.

With respect to the first configurable aspect of an enricher identified above, there may be various different types of enrichment operations that may be performed by an enricher, and in this respect, enrichers may generally be categorized based on the type of enricher operations they perform. These enrichment operations may take various forms.

As one possibility, an enricher may be configured to derive a data value for a new data field based on the data values of the message's existing data fields and then append the new data field to the message. In this respect, the data value of the new data field may comprise a data value of an existing data field in the message (or at least a portion thereof), a concatenation of the data values for two or more existing data fields in the message, or a data value that is calculated based on the data values for two or more existing data fields in the message, among other possibilities.

As another possibility, an enricher may be configured to retrieve a data value from an external source and then append the retrieved value to the message. In this respect, the external source may take the form of a database, an API, or a URL, among other possibilities.

As yet another possibility, an enricher may be configured to create a missing key for a key/value pair in a message and then append that key to the message.

As still another possibility, an enricher may be configured take certain data values included in a message and transform them into a different data structure. For example, if a message comprises a file containing multiple lines of data, an enricher may be configured to decompose the file into a single processable message per line. As another example, if a message comprises a collection of data values in the form of an array or a list, an enricher may be configured to transform the collection of data values into a different data structure such as a map or a set. Other examples are possible as well.

The type of enrichment operation to be performed by an enricher (and thus the type of enrichment produced by the enricher) may take various other forms as well.

It will also be appreciated from the foregoing that, depending on the type of enrichment operation to be performed by an enricher, configuring this first aspect of the enricher may involve an identification of the particular aspect(s) of the streaming message (e.g., the particular data field(s)) that are used to create the new enrichment.

With respect to the second configurable aspect of an enricher identified above, an enricher may be configured to append an enrichment to a message in one of various manners. As one possibility, an enricher may be configured to embed an enrichment as an additional field in the payload of a message, which may either be placed at the end of the message's payload or at some other location within the message's payload. As another possibility, an enricher may be configured to replace a value of an existing data field in the payload of a message with the enrichment. As yet another possibility, an enricher may be configured to append the enrichment as an attribute in a message envelop that also contains the payload of a message. An enricher may append an enrichment to a message in other manners as well.

With respect to the third configurable aspect of an enricher identified above, an enricher may optionally be configured with logic for handling errors that may arise as the enricher is being applied to the received messages. In general, a given enricher's error-handling logic may be configured to cause asset data platform 102 to monitor for errors while applying the given enricher to the received messages, and then if an error is detected at the given enricher, determine what action(s) to take in view of the detected error (e.g., by determining what happens to the enrichment being created by the given enricher and/or how to route the input message in the pipeline after it exits the given enricher). In this respect, the errors that may arise while applying the given enricher to the received messages may take various forms.

As one example, an error may arise when an enricher configured to use a data value of a given field of an input message to perform a lookup for a corresponding data value in a database is unable to find the desired information in the database. As another example, an error may arise when an enricher that is configured to extract a data value from a URL is unable to access the URL. As yet another example, an error may arise when a message provided to an enricher includes the wrong type of data value. For instance, an enricher that is configured to modify the case of a string (e.g., all uppercase/all lowercase) may be unable to modify a data value containing numbers to uppercase letters. Many other types of errors may arise as well.

Further, the logic that defines what action to take in view of a detected error at a given enricher may take various forms. As one possibility, a given enricher's error-handling logic may specify that when an error is detected while operating on a given message, the given message is not output to the next enricher in the pipeline, thereby causing the pipeline to stop operating on the given message. In this respect, the given enricher's error-handling logic may cause the given message and/or the enrichment produced by the given enricher to be discarded and/or quarantined.

As another possibility, a given enricher's error-handling logic could specify that when an error is detected while operating on a given message, the given message is simply passed through to the next enricher in the pipeline without appending an enrichment (i.e., the given enricher is effectively skipped), thereby allowing the pipeline to continue operating on the given message such that the other downstream enrichers in the pipeline can still produce and append enrichments to the given message.

As yet another possibility, a given enricher's error-handling logic could specify that when an error is detected while operating on a given message, then instead of passing the given message to the next enricher in the enrichment pipeline, the given message is routed to an alternative destination (e.g., an error/quarantine destination and/or an alternate data processing pipeline). In this respect, the alternative destination may take various forms, examples of which may include a database, a data warehouse, and/or a streaming message topic (which may serve as the input to another enrichment pipeline).

As still another possibility, a given enricher's error-handling logic could specify that when an error is detected while operating on a given message, the enrichment is still nevertheless produced and appended to the given message and passed to the next enricher in the pipeline.

As a further possibility, a given enricher's error-handling logic could specify that when an error is detected while operating on a given message, the given enricher performs some other predefined action, such as appending a default enrichment to the message.

As still a further possibility, a given enricher's error-handling logic could specify that when an error is detected while operating on a given message, the given enricher first retries its enrichment operation on the given message a given number of times to see whether an enrichment can be produced and appended without error, and then carries out one of the other error-handling actions discussed above if the given enricher's retry attempt(s) fail.

It should also be understood that a given enricher's error-handling logic may be configured to carry out different error-handling actions depending on the type of error that is detected. For instance, a given enricher's error-handling logic may be configured to take a first error-handling action (e.g., suppressing the message) when a first type of error is detected, a second error-handling action (e.g., passing the message through without an enrichment) if a second type of error is detected, and so on. A given enricher's error-handling logic may take various other forms as well.

While an enricher is described herein as having up to three configurable aspects, it should be understood that a given enricher may not have all three of these configurable aspects. For instance, in some embodiments, a given enricher may not have any error-handling logic (i.e., the error-handling logic of an enricher may be optional).

Further, it should be understood that at least one of the configurable aspects of an enricher may have a "default" setting that is used in place of user configuration for that aspect of the enricher. For instance, an enricher may have a "default" setting for the manner in which the enricher appends a produced enrichment to a message, such that this configurable aspect of the enricher is configured by default to append enrichments in a particular way. In this respect, a "default" setting could either apply to all enricher types or apply to only a subset of enricher types, in which case different enricher types may have different "default" settings (e.g., an enricher for performing a first type of enrichment operation may have a first "default" setting for how to append enrichments, an enricher for performing a second type of enrichment operation may have a second "default" setting for how to append enrichments, etc.). Also, a "default" setting for an enricher may or may not be user modifiable, depending on the particular type of "default" setting and/or the particular implementation.

Further yet, it should be understood that an enricher could have other configurable aspects in addition to those described herein, and/or that an enricher could take other forms as well.

Turning to the "router" type of operator, as noted above, a router may generally be configured to receive a streaming data message, decide whether to perform a routing operation on the received message (versus whether to simply pass the received message to the next operator in the pipeline), and then handle the received message in accordance with that decision. In line with this general configuration, the configurable aspects of a router may include (1) the routing operation to be performed by the router, (2) the conditional logic that dictates whether to perform the routing operation for a received message, and (3) the error-handling logic carried out by the router, if any. Each of these configurable aspects of a router will now be described in further detail below.

With respect to the first configurable aspect of a router identified above, the routing operation that is to be performed by a router when a routing decision is made may take various forms. As one possibility, a router may be configured such that when it decides to "route" the message, it outputs the received message to one or more data sinks outside of the pipeline instead of passing the received message to the next operator in the pipeline. As another possibility, a router may be configured such that when it decides to "route" the message, it outputs the received message to one or more data sinks outside of the pipeline in addition to also still passing the received message to the next operator in the pipeline. A router's configurable routing operation may take other forms as well.

In accordance with the present disclosure, the one or more data sinks to which a router may be configured output a received message may take any of various forms. For instance, each of the one or more data sinks could take the form of a database, a data warehouse, and/or a streaming message topic (e.g., a message topic that serves as the data source for another data processing pipeline), among other examples. Further, in some embodiments, a router could be configured to output a received message to an undefined and/or "null" data sink, which effectively results in the message being discarded. The one or more data sinks to which a router may be configured to output a received message may take other forms as well.

With respect to the second configurable aspect of a router identified above, as noted above, a router may be configured with conditional logic that dictates whether the router performs a routing operation on a received message versus whether the router simply passes the received message to the next operator in the pipeline. At a high level, this conditional logic may generally comprise any function that evaluates one or more aspects of a received message and/or other contextual information and then returns a value that indicates whether or not to perform the routing operation (e.g., a Boolean value). Such conditional logic may take various forms.

As one possibility, a router may be configured with conditional logic that evaluates whether a streaming message itself is invalid. For instance, if the message is a key/value pair, a router may be configured with conditional logic that evaluates whether the "key" and/or the "value" within that key/message pair contains any invalid data, and if so, decides to perform a routing operation. Conditional logic for evaluating whether a streaming message itself is valid may take various other forms.

As another possibility, a router may be configured with conditional logic that evaluates whether a streaming message's contents are invalid. For instance, a router may be configured with conditional logic that evaluates whether a message's envelope contains any invalid metadata and/or an invalid payload, and if so, decides to perform a routing operation. Conditional logic for evaluating whether a streaming message's contents are invalid may take various other forms.

As yet another possibility, a router may be configured with conditional logic that evaluates whether a streaming message's contents meet certain conditions. This type of conditional logic may take various forms.

In one example, a router may be configured with conditional logic that evaluates whether a streaming message's metadata and/or payload contains a particular data field (e.g., a "temperature" field), and if so, decides to perform a routing operation. In another example, a router may be configured with conditional logic that evaluates whether the data value for a given data field within a streaming message's metadata and/or payload meets particular criteria for the given data field, and if so, decides to perform a routing operation. In such an example, the particular criteria for the data value may comprise a particular value (or a set of particular values), a particular range of values, or the like. Conditional logic for evaluating whether a streaming message's contents meet certain conditions may take various other forms, including the possibility that the conditional logic checks for the existence of multiple data fields and/or checks the data values for multiple data fields while making the routing decision.

As still another possibility, a router may be configured with conditional logic that evaluates certain contextual information as a basis for determining whether to perform the routing operation. For example, a router may be configured with conditional logic that evaluates the time at which the router receives a streaming message, and if that time meets particular criteria (e.g., falls within a given time range), decides to perform a routing operation.

It should be understood that a router may be configured with conditional logic that decides whether to perform a routing operation based on two or more of the aforementioned types of evaluations. For example, a router may be configured with conditional logic that decides whether to perform a routing operation based on an evaluation of both the validity of a streaming message and also whether the streaming message's contents meet certain conditions.

Further, while the router's conditional logic is described above as returning a binary indication of whether or not to perform a routing operation, it should be understood that a router's conditional logic may return more than two values, each of which corresponds to a different routing operation. For example, a router's conditional logic may return a first value that corresponds to no routing operation (i.e., simply passing the message to the next operator), a second value that corresponds to a first type of routing operation, a third value that corresponds to a second type of routing operation, and so on. Such a router may be referred to as a "multi-way router."

In some embodiments, it may also be possible to configure a router such that it performs a routing operation on every streaming message it receives, regardless of the circumstance. For instance, a router may be configured such that it does not include any conditional logic, or may be configured to include conditional logic that will always return the same result (e.g., a "true" output) regardless of the streaming message being received, the time of day, etc. In this respect, the router may be thought of as having "unconditional" logic for deciding whether to perform the routing operation. To illustrate with an example, a router may be configured to unconditionally pass every streaming message to the next operator in the pipeline and also to unconditionally send a copy of every streaming message to a data sink for archival purposes. Other examples may be possible as well.

With respect to the third configurable aspect of a router identified above, a router may be optionally configured to carry out error-handling logic to determine what action(s) to take in view of an error (e.g., by determining what happens to the input message that is processed by a given router and/or how to route the input message after it exits the given router in view of an error). The errors that may arise may take various forms, such as various processing errors or network congestion from routing the input message to one or more destinations, among other examples. Further, the logic that defines what action to take in view of a detected error may take forms that are similar to those described above regarding the enrichers.

While a router is described herein as having up to three configurable aspects, it should be understood that a given router may not have all three of these configurable aspects. For instance, a router may not have any error-handling logic (i.e., the error-handling logic of a router may be optional).

Further, it should be understood that at least one of the configurable aspects of a router may have a "default" setting that is used in place of user configuration for that aspect of the router. For instance, a router may have a "default" setting for routing operation, such that this configurable aspect of the router is configured by default to route messages in a particular manner. In this respect, a "default" setting could either apply to all router types or apply to only a subset of router types. Also, a "default" setting for a router may or may not be user modifiable, depending on the particular type of "default" setting and/or the particular implementation.

Further yet, it should be understood that a router could have other configurable aspects in addition to those described herein, and/or that a router could take other forms as well.

Turning to the "transformer" type of operator, as noted above, a transformer may generally be configured to receive a streaming data message, transform the message into a different form, and then output the transformed version of the message. In line with this general configuration, the configurable aspects of a transformer may include (1) the particular transformation operation to be performed by the transformer, and (2) the error-handling logic carried out by the transformer, if any. Each of these configurable aspects of a transformer will now be described in further detail below.

With respect to the first configurable aspect of a transformer identified above, there may be various different types of transformation operations that may be performed by the transformer to transform a given message into a different form. In this respect, transformers may generally be configured to transform the structure of a given message (rather than the content of the given message) and may be categorized based on the type of transformation operations they perform. These transformation operations may take various forms.

As one possibility, transformer may be configured to transform a streaming data message having a given format into rows and/or columns of data. In this respect, the given format may take the form of a table, which may be split into one or more rows and/or columns, among other possibilities.

As another possibility, transformer may be configured to transform a streaming data message having a given format into one or more text strings. In this respect, the given format may take the form of a table, row(s) of data, column(s) of data, which may be transformed into one or more text strings, among other possibilities.

The type of transformation operation to be performed by a transformer (and thus the output of the transformer) may take various other forms as well.

It will also be appreciated from the foregoing that, depending on the type of transformation operation to be performed by a transformer, configuring this first aspect of the transformer may involve an identification of the particular aspect(s) of the streaming message that are the subject of the transformation operation.

With respect to the second configurable aspect of a transformer identified above, a transformer may be optionally configured to carry out error-handling logic to determine what action(s) to take in view of an error (e.g., by determining what happens to the given message that is transformed by a given transformer and/or how to route the given message after it exits the given transformer in view of an error). The errors that may arise may take various forms, such as errors that may arise when a given transformer is unable to transform the given message from one form to another (e.g., unable to transform a given text string into multiple rows), among other examples. Further, the logic that defines what action to take in view of a detected error may take forms that are similar to those described above regarding the enrichers.

While a transformer is described herein as having up to two configurable aspects, it should be understood that a given transformer may not have all of these configurable aspects. For instance, a transformer may not have any error-handling logic (i.e., the error-handling logic of a transformer may be optional).

Further, it should be understood that at least one of the configurable aspects of a transformer may have a "default" setting that is used in place of user configuration for that aspect of the transformer. For instance, a transformer may have a "default" setting for transformation operations, such that this configurable aspect of the transformer is configured by default to transform messages in a particular form. In this respect, a "default" setting could either apply to all transformer types or apply to only a subset of transformer types. Also, a "default" setting for a transformer may or may not be user modifiable, depending on the particular type of "default" setting and/or the particular implementation.

Further yet, it should be understood that a transformer could have other configurable aspects in addition to those described herein, and/or that a transformer could take other forms as well.

As noted above, a pipeline that is configured in accordance with the present disclosure may generally comprise two or more operators that are chained together (e.g., in a sequential manner). In this respect, a pipeline may be configured to receive streaming messages from a data source and output streaming messages to one or more data sinks, where the pipeline's two or more operators may be applied to each streaming message that flows through the pipeline in order to perform a desired sequence of data processing operations on each streaming message. Such a pipeline may take various forms and be configured in various manners.

At a high level, a pipeline may be configured to include any combination of two or more operators, each of which may take any of the forms described above. For instance, as one possibility, a pipeline may be configured to include a single type of operator only, such a chain of enrichers only. As another possibility, a pipeline may be configured to include a combination of multiple different types of operators, such as a combination of at least one enricher and at least one router.

Further, the two or more operators of the pipeline may be chained together in any of various different sequences. For instance, as a pipeline is being configured via the disclosed tool, the sequence of operators may be configured starting with the first operator in the pipeline (e.g., the operator that receives streaming messages from the pipeline's data source) and concluding with the last operator in the pipeline (e.g., the operator that outputs the processed streaming messages to the pipeline's data sink). In this respect, each operator in the pipeline may have (1) an input that is connected either to the pipeline's data source or another operator and (2) an output that is connected either to the pipeline's data sink(s) or another operator.

Further yet, in some embodiments, a pipeline may be configured to include a "global operation," which is a data processing operation that gets performed as a streaming message is being input into each operator in the pipeline. For instance, a pipeline may be configured to include a global routing operation that is to be performed at the input of each other operator in the chain, which may take various forms. As one example, such a global routing operation may check for invalid data at each operator's input and then route streaming messages having invalid data to a data sink outside of the pipeline. As another example, such a global routing operation may pass each streaming message to the next operator and also route a copy of each streaming message to a data sink used for archival purposes. A global operation for a pipeline may take various other forms as well, including the possibility that the global operation is an enrichment or transformation operation rather than a routing operation. In effect, configuring a global operation for a pipeline may avoid the need to configure multiple individual instances of the same operator.

In accordance with the present disclosure, it may also be possible to create a data processing configuration having two or more pipelines that are interconnected with one another. For instance, as one possibility, the pipeline configuration tool may be used to create a sequential configuration of at least two different pipelines, where a first pipeline serves as the data source for a second pipeline. In such a configuration, the last operator in the first pipeline may be configured to output messages to a streaming message topic that serves as the input to the second pipeline, which may in turn result in the first operator in the second pipeline receiving updated messages from the first pipeline and then passing such messages through the second pipeline in a manner similar to that described above.

As another possibility, the pipeline configuration tool may be used to create a configuration in which a given router in a first pipeline serves as the data source for a second pipeline. In such a configuration, the given router in the pipeline may be configured to conditionally (or unconditionally) output messages to a streaming message topic that serves as the input to the second pipeline, which may in turn result in the first operator in the second pipeline receiving messages from the given router and then passing such messages through the second pipeline in a manner similar to that described above.

As yet another possibility, the pipeline creation tool may be used to create a configuration in which a given router in a first pipeline serves as the data source for multiple other pipelines, such as a second pipeline and a third pipeline. In such a configuration, the given router may be configured to output messages to (1) a first streaming message topic that serves as the input to the second pipeline, and (2) a second streaming message topic that serves as the input to the third pipeline. As a result, the first operator in the second pipeline and the first operator in the third pipeline may each receive messages from the given router and then pass the messages through its respective pipelines in a manner similar to that described above.

Various other data processing configurations comprised of multiple pipelines may be created as well.

In conjunction with the ability to create data processing configurations comprised of multiple pipelines, the disclosed pipeline configuration tool can also be used to break a desired sequence of data processing operations into multiple different pipelines. For instance, instead of creating and deploying a single pipeline comprised of a long sequence of data processing operations, the disclosed tool may be used to create a data processing configuration in which the data processing operations may be separated out into two or more discrete pipelines.

This ability to break a desired sequence of data processing operations into smaller, discrete pipelines may provide several advantages. First, breaking a longer sequence of data processing operations into smaller, discrete pipelines may result in a more efficient resource utilization, because the data analytics system may then have the ability to scale certain sequences of data processing operations differently than other sequences of data processing operations. Second, breaking a sequence of data processing operations into smaller, discrete pipelines may improve the process for creating a data processing configuration going forward, because these smaller, discrete pipelines can then be used as building blocks for creating a new data processing configuration (as opposed to requiring each new data processing configuration to be built from scratch). Breaking a desired sequence of data processing operations into smaller, discrete pipelines may provide other advantages as well.

After creating one or more configurable pipelines with the disclosed pipeline configuration tool, the one or more configurable pipelines may then be deployed by the data analytics system, such that a desired sequence of data process operations is carried out on a stream of data messages received from a data source. To illustrate such operations at a high level, one example is described herein with respect to a pipeline that is configured to include at least two enrichers and at least one router that is chained between two enrichers.

In such a pipeline, the first enricher in the pipeline may be configured to receive each streaming message from a data source, produce and append a first enrichment to each streaming message, and output a first updated version of each streaming message.

Next, the router may be configured to receive the first updated version of each streaming message and then conditionally decide whether to perform a routing operation on the first updated version of each message. In this respect, if the first updated version of a streaming message satisfies the router's conditional logic, the router may output the first updated version of the streaming message to a data sink outside of the pipeline; otherwise, the router may simply pass the first updated version of the streaming message to the second enricher.

In turn, the second enricher in the chain may be configured to receive the first updated version of each streaming message from the router, produce and append a second enrichment to each streaming message received from the router, and then output a second updated version of each streaming message received from the router. Streaming messages may then continue to progress through the pipeline (and/or be routed out of the pipeline) in a similar manner until the last operator in the chain outputs a final updated version of the message, which may in turn be provided to a data sink such as a database, a data warehouse, a streaming message topic (e.g., a Kafka topic), or the like.

For purposes of illustration, the disclosed pipeline configuration tool will now be described in the context of the example network configuration 100 depicted in FIG. 1, but it should be understood that the disclosed approach may be carried out in various other contexts as well—including configurations that are unrelated to asset data. Further, to help describe some of the operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

In the context of FIG. 1, asset data platform 102 may install and then begin running an instance of the disclosed pipeline configuration tool, which may cause asset data platform 102 to provide a user (e.g., an individual tasked with setting up the ingestion of data sources) with an interface that enables the user to create and the request deployment of one or more pipelines for one of data sources 104. In practice, asset data platform 102 may provide this interface to the user either by communicating with a client station (e.g., client station 104E or 106A) in a manner that causes the client station to present the interface to the user or by presenting the interface via a display screen that is included as part of the platform, among other possibilities.

After a user creates and requests deployment of a new pipeline via the interface, asset data platform 102 may deploy the new enrichment pipeline as part of the enhancement stage of data ingestion system 302, which may be applied before or after the transformation stage of data ingestion system 302. However, asset data platform 102 may deploy the new pipeline in other manners as well.

Figure 6:
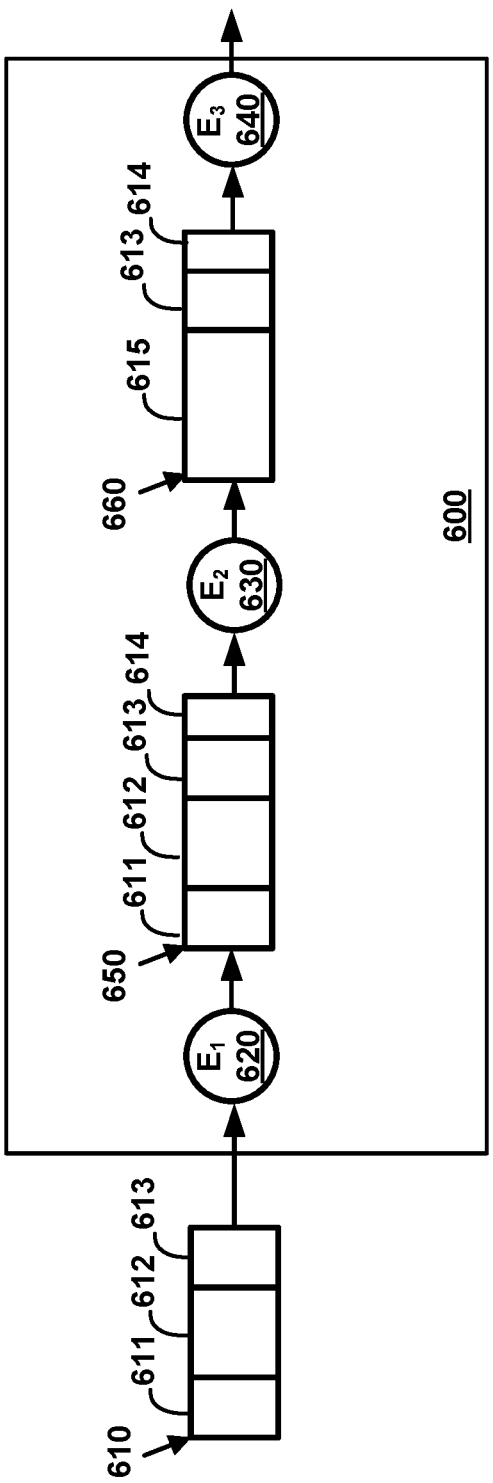
FIG. 6 depicts an example pipeline that may be created and deployed.

FIG. 6 illustrates one example of a pipeline 600 that may be created and deployed in accordance with the present disclosure. As shown in FIG. 6, example pipeline 600 may include a chain of operators that includes enrichers 620, 630, 640 being applied input message 610, which may take various forms.

As one example, the input message 610 may be a streaming message from a data source. The data source may comprise one of the example data sources 104 described above, such as asset 104A, operating data source 104B, maintenance data source 104C, environmental data source 104D, or client station 104E. Input message 610 may have a payload that includes data fields 611, 612, and 613, each of which may have one or more data values corresponding to a data field. For instance, field 611 may have a data value that corresponds to a given asset's serial number, field 612 may have a data value that corresponds to a given asset's manufacturer, and field 613 may have a data value that corresponds to a given asset's temperature. The data values may be, for example, alphabetical, numerical, or alphanumerical values. Other examples are possible as well.

Enrichers 620, 630, and 640, which may be selected or created via the pipeline configuration tool, may take any of the forms previously described. For purposes of illustration, enrichers 620, 630, and 640 may be interconnected together in a sequential manner, such that enricher 620 is the first enricher, enricher 630 is the second enricher, and enricher 640 is the last enricher in the chain. While FIG. 6 shows three enrichers, it should be understood that more or less operators may be included in pipeline 600. Further, in line with the discussion above, each of enrichers 620, 630, and 640 may have various configurable aspects.

First, each enricher in enrichment pipeline 600 may be configured to carry out a particular type of enrichment operation, which may take various forms as described above. For instance, enricher 620 may be configured to use the data value of a given field, such as field 613 of input message 610, to retrieve a temperature value from a URL (e.g., weather.com). The retrieved temperature value may then be appended to input message 610. Enricher 630 may be configured to take data values of two or more fields (i.e., fields 611, 612) and concatenate such data values together to produce a data value for a new data field, which may be appended to updated message 650. Enricher 640 may be configured to create a missing key for a key/value pair in the input message 610.

In general, a key may be a unique identifier corresponding to a data value, which together may be referred to as a key/value pair. After producing the missing key for the key/value pair, enricher 640 may be configured to append the key (or key/value pair) to the message that was received from the previous enricher in the chain. For example, enricher 640 may receive a message from the previous enricher. The message, however, may include a data value that is missing a corresponding key. Based on the characteristics of the data value (e.g., an alphanumeric value having a certain length), enricher 640 may identify the value as corresponding to an assetID key. Enricher 640 may then create the assetID key and append the key/value pair to the received message. Enrichers 620, 630, and 640 may be configured to carry out one or more additional enrichment operations as well.

As one example, in addition to retrieving a temperature value from a URL, enricher 620 may also be configured to modify the case of a string (e.g., all uppercase/all lowercase), truncate a string (e.g., first 50 characters) and/or convert a value from one unit to another (e.g., Megawatts to Kilowatts) and then append the value to the input message 610. Other examples involving enrichers 620, 630, and/or 640 are possible as well.

Second, enrichers 620, 630, and 640 may be configured to append its produced enrichment to a message in one of various manners. For instance, as the first enricher in the chain of enrichers, enricher 620 may receive input message 610 and perform any one or more operations previously described to produce an enrichment, and enricher 620 may then append the enrichment to input message 610 by adding an enrichment field 614. Enricher 620 may append an enrichment to input message 610 in various other manners as well.

After adding enrichment field 614 to the input message 610, enricher 620 may then output an updated message 650 downstream to enricher 630 (i.e., the next operator in pipeline 600). As shown, the updated message 650 includes fields 611, 612, and 613 from input message 610 along with enrichment field 614, which is appended at the end of field 613.

Subsequently, enricher 630 may produce an enrichment and append the enrichment to updated message 650. As shown, enricher 630 may append an enrichment by replacing the values of fields 611 and 612 with enrichment field 615. Enricher 630 may append an enrichment to updated message 650 in various other manners as well.

In turn, enricher 630 may output an updated message 660 downstream to enricher 640. As shown, the updated message 660 includes field 613 from input message 610, enrichment field 614, and enrichment field 615.

Finally, enricher 640 may produce an enrichment and append an enrichment field to updated message 660. Enricher 640 may then output an updated message (not shown) downstream to a data sink in asset data platform 102, such as a database, a data warehouse, a streaming message topic (e.g., a Kafka topic), or the like. The updated message that is output by enricher 640 may include enrichment field 614, enrichment field 615, and another enrichment field (not shown).

To further illustrate how enrichers in a pipeline may operate in practice, another example involving pipeline 600 will now be described.

First, after acquiring a stream of messages from a data source (e.g., one of data sources 104), input message 610 containing fields 611-613 may be input into the enrichment pipeline 600, starting with enricher 620. Fields 611 and 612 may be, for example, "Serial Number" and "Manufacturer" fields associated with a given asset (e.g., asset 104A). The enricher 620 may be configured to use the "Manufacturer" value of the given asset to retrieve a time zone offset (TZO) value from a database that corresponds to the "Manufacturer" value. The retrieved TZO value may then be appended to input message 610 as enrichment field 614, and output downstream as updated message 650.

Next, the updated message 650 is provided to enricher 630 in pipeline 600. Enricher 630 may be configured to take the data values from fields 611 and 612 (e.g., "Serial Number" and "Manufacturer" fields) and concatenate such data values into a single data value to produce a new "assetID" field. The data value for the new "assetID" field may then be appended to updated message 650 by replacing fields 611 and 612 with enrichment field 615. Enricher 630 may then output the appended message downstream as updated message 660.

Subsequently, the updated message 660 is provided to enricher 640. Enricher 640 may be configured to create a missing key for a key/value pair in the updated message 660, append the key to the updated message 660 in an enrichment field, and output an updated message downstream to a data sink in asset data platform 102. Other examples involving different enricher combinations may be possible as well.

In accordance with the present disclosure, one or more of enrichers 620, 630, and 640 may also optionally be configured with error-handling logic. To illustrate how a pipeline may operate with at least one enricher that is configured with error-handling logic, FIGS. 7A-7D illustrate some representative examples of actions that may be taken in view of a detected error with reference to an example pipeline 700, which may take any of the forms previously described. It should be understood that these example actions are merely provided for purposes of illustration, and that the disclosed error-handling logic may cause asset data platform 102 to respond to a detected error in various other manners as well.

Figure 7A:
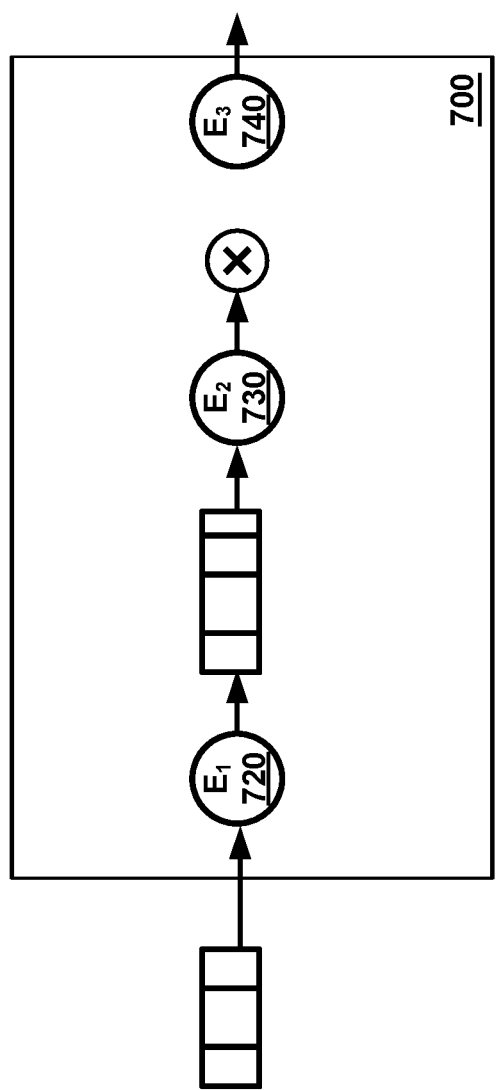
FIG. 7A depicts one example of an error-handling action that may be taken in view of a detected error at a given operator in a pipeline.

In particular, FIG. 7A shows one example of an error-handling action that may be taken in view of a detected error at a given enricher in pipeline 700, such as enricher 730. In general enrichers 720, 730, and 740, which may be selected or created via the CEP tool, may take any of the forms previously described. As shown in FIG. 7A, the error-handling logic may dictate that when an error is detected at enricher 730 while operating on a given message, enricher 730 is not to output the given message to the next enricher in the pipeline (i.e., enricher 740), thereby causing pipeline 700 to stop operating on the given message. In this respect, the error-handling logic of enricher 730 may cause the given message (and/or the enrichment produced by the given enricher) to be discarded and/or quarantined.

Figure 7B:
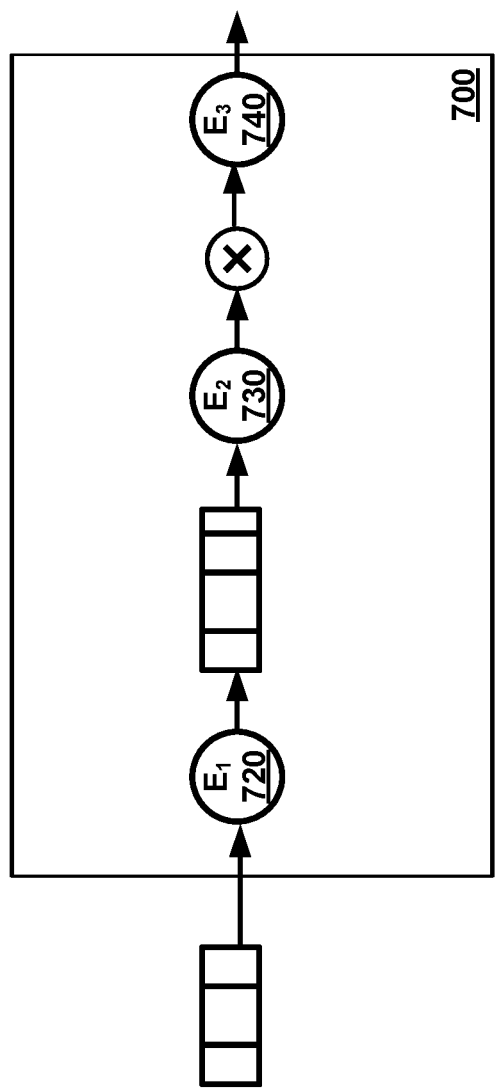
FIG. 7B depicts another example of an error-handling action that may be taken in view of a detected error at a given operator in a pipeline.

FIG. 7B shows another example of an error-handling action that may be taken in view of a detected error at a given enricher in pipeline 700, such as enricher 730. As shown, the error-handling logic could specify that when an error is detected at enricher 730 while operating on a given message, the given message is simply passed through to enricher 740 (i.e., the next enricher in pipeline 700) without appending an enrichment to the given message. In this respect, enricher 730 is effectively skipped, thereby allowing the remaining enricher(s) to continue operating on the given message such that the remaining enricher(s) can still produce and append enrichments to the given message.

Figure 7C:
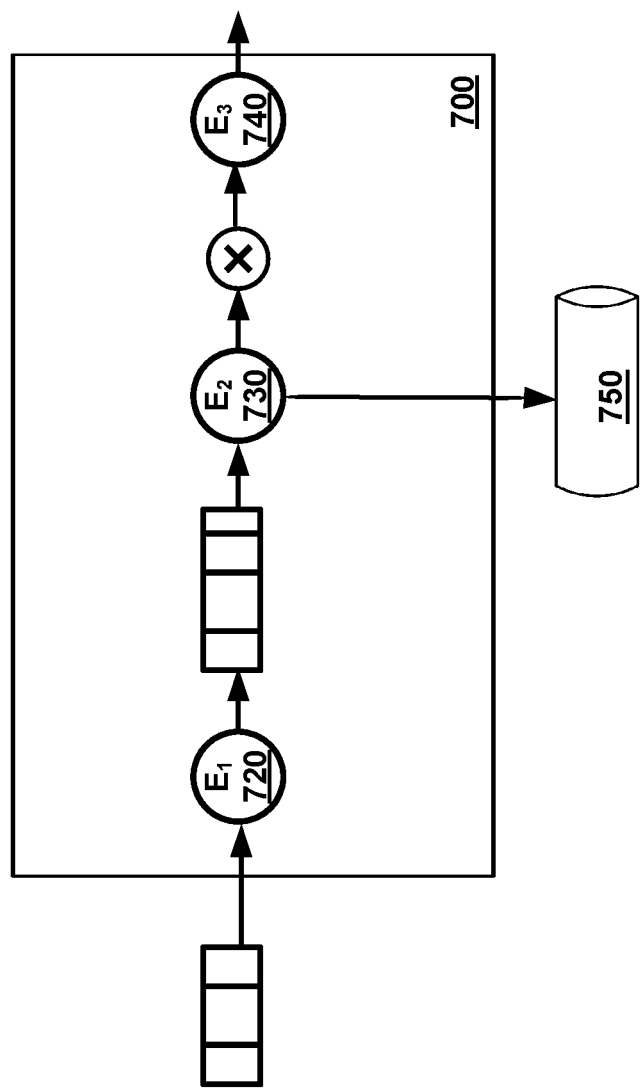
FIG. 7C depicts yet another example of an error-handling action that may be taken in view of a detected error at a given operator in a pipeline.

FIG. 7C shows yet another example of an error-handling action that may be taken in view of a detected error at a given operator in pipeline 700, such as enricher 730. As shown, the error-handling logic could specify that when an error is detected at enricher 730 while operating on a given message, then instead of passing the given message to enricher 740 (i.e., the next enricher in pipeline 700), the given message is routed to an alternative destination 750. In this respect, alternative destination 750 may take various forms, examples of which may include a database, a data warehouse, and/or a streaming message topic (which may serve as the input to another pipeline).

Figure 7D:
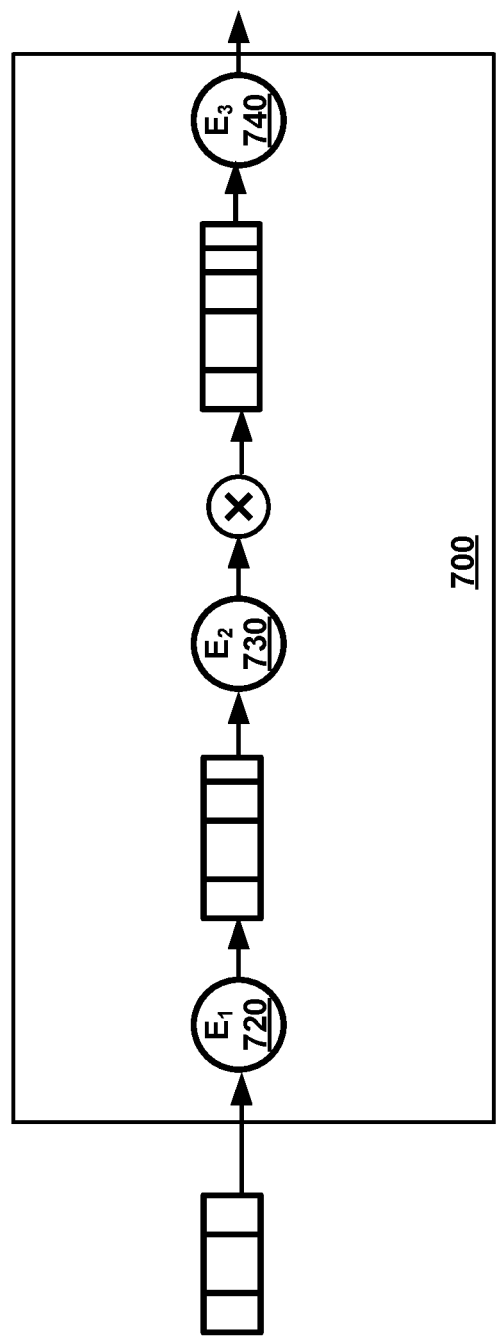
FIG. 7D depicts a further example of an error-handling action that may be taken in view of a detected error at a given operator in a pipeline.

FIG. 7D shows a further example of an error-handling action that may be taken in view in view of a detected error at a given enricher in pipeline 700, such as enricher 730. As shown, the error-handling logic could specify that when an error is detected at enricher 730 while producing a given message, the enrichment is still nevertheless produced and appended by enricher 730. For instance, enricher 730 may be configured to retrieve a TZO value from a database that corresponds to an "assetID" value of the given message. However, the TZO value that corresponds to the "assetID" value may be missing from the database. The enricher 730 may still nevertheless output a TZO value (e.g., a default value, such as UTC) that corresponds to the "assetID" value, which can then be appended to the given message and output downstream to enricher 740.

In addition to the example error-handling actions illustrated in FIGS. 7A-7D, several variations are also possible. For example, the error-handling logic could specify that when an error is detected at enricher 730 in pipeline 700 while operating on a given message, enricher 730 is to first retry its enrichment operation on the given message a given number of times to see whether an enrichment can be produced and appended without error, and then carry out one of the other error-handling actions discussed above if retry attempt(s) fail.

Specifically, enricher 730 may be configured to extract a temperature value from a URL (e.g., weather.com), but enricher 730 may be unable to access the URL, which may be temporarily unavailable due to maintenance, among other possible reasons. In such a scenario, enricher 730 may attempt to extract the temperature value from the URL until it finally becomes available, or for a given number of times to see whether an enrichment can be produced and appended without error.

The error-handling logic of enricher 730 may take various other forms as well.

Figure 8:
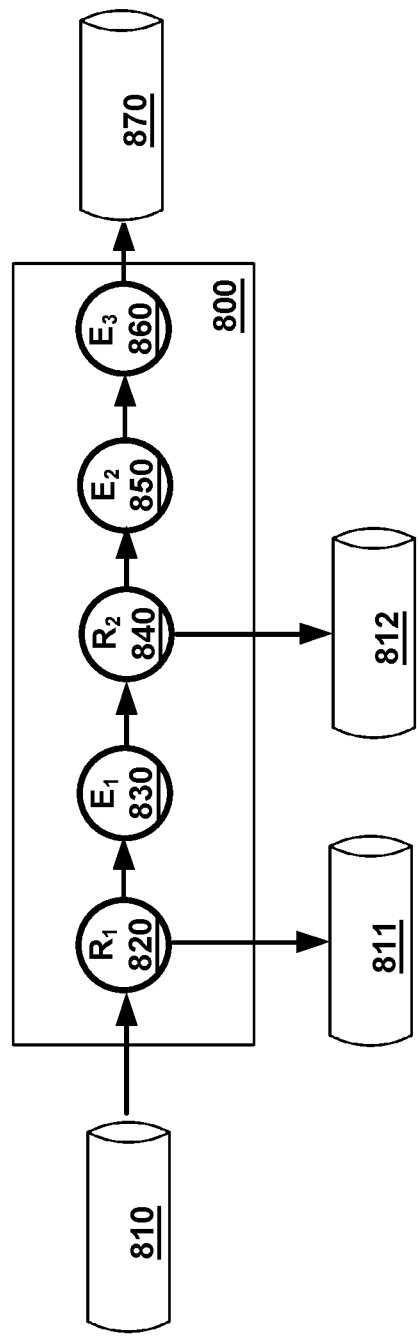
FIG. 8 depicts a flow diagram of another example pipeline that may be created and deployed.

Turning now to FIG. 8, an example pipeline 800 that includes different types of operators (e.g., enrichers and routers) will be described. As shown in FIG. 8, pipeline 800 may include a chain of operators that includes routers 820, 840, and enrichers 830, 850, 860. For purposes of illustration, routers 820, 840 are chained together with enrichers 830, 850, 860 in a serial manner, such that router 820 is the first operator, enricher 830 is the second operator, router 840 is the third operator, enricher 850 is the fourth operator, and enricher 860 is the last operator in the chain.

Further, pipeline 800 may be configured to receive streaming data messages from data source 810 and output data messages to data sink 870. In accordance with the present disclosure, data source 810 may be an asset, an operating data source, a maintenance data source, an environmental data source, or a client station, among other examples. Data sink 870 may take the form of any data structure previously described, examples of which may include a database, a data warehouse, and/or a streaming message topic (which may serve as the input to another pipeline).

Enrichers 830, 850, 860, which may be selected and created via the pipeline configuration tool, may take any of the forms previously described. Further, in line with the discussion above, each enricher may have various configurable aspects.

Similarly, routers 820, 840, which may be selected and created via the pipeline configuration tool, may take any of the forms previously described and may each have various configurable aspects.

For instance, router 820 may be configured to receive streaming messages from data source 810, decide whether to perform a routing operation on each received message (versus whether to simply pass the received message to the next operator in the pipeline, i.e., enricher 830), and then handle the received message in accordance with that decision. In this respect, router 820 may be configured with conditional logic that evaluates whether each streaming message received from data source 810 meets certain conditions, and then if so, causes router 820 to output the received message to data sink 811 outside of pipeline 800 instead of passing the message to enricher 830. In line with the discussion above, the conditional logic of router 820 may take various forms.

As one possible example, the conditional logic may evaluate whether a received message's metadata and/or payload contains any invalid data, and then if so, may cause router 820 to output the received message to data sink 811. In this respect, data sink 811 may take the form of a database for archiving invalid messages, among other possibilities.

As another possible example, if the streaming messages originated from a plurality of different assets and include a data field that indicates the asset type for the message's originating asset, the conditional logic may evaluate whether the data value of that "Asset Type" data field matches a particular value (or set of values), and if so, may cause router 820 to output the received message to data sink 811. In this respect, data sink 811 may take the form of a message topic that serves as input into a different pipeline (not shown), which may be useful in scenarios where the streaming messages produced by certain types of assets have a different format and/or structure and thus call for a different sequence of data processing operations. Many other examples are possible as well.

Similarly, router 840 may be configured to receive an updated streaming data message from enricher 830, decide whether to perform a routing operation on the updated message (versus whether to simply pass the received message to the next operator in the pipeline, i.e., enricher 850), and then handle the received message in accordance with that decision. In this respect, router 840 may be configured with conditional logic that evaluates whether each streaming message received from enricher 830 meets certain conditions, and then if so, causes router 840 to both pass the message to enricher 850 and also output the received message to data sink 812 outside of pipeline 800. In line with the discussion above, the conditional logic of router 840 may take various forms.

As one possible example, the conditional logic may evaluate whether a received message is associated with a "new" asset for which asset data platform 102 has not previously received data, and if so, may cause router 840 to both pass the message to enricher 850 and also output the received message to data sink 812. In this respect, data sink 812 may take the form of a message topic that serves as input into a different pipeline (not shown) for creating a profile for the "new" asset, among other possibilities.

As another possible example, the conditional logic may evaluate whether the time at which router 840 receives a message from enricher 830 falls within a given time range, and if so, may cause router 840 to both pass the message to enricher 850 and also output the received message to data sink 812. In this respect, data sink 812 may take the form of an archival database, among other possibilities. Many other examples are possible as well.

Although not shown in FIG. 8, router 820 and/or 840 may also include error-handling logic to determine what action(s) to take in view of an error (e.g., by determining what happens to the input message that is processed by a given router and/or how to route the input message after it exits the given router in view of an error).

Figure 9:
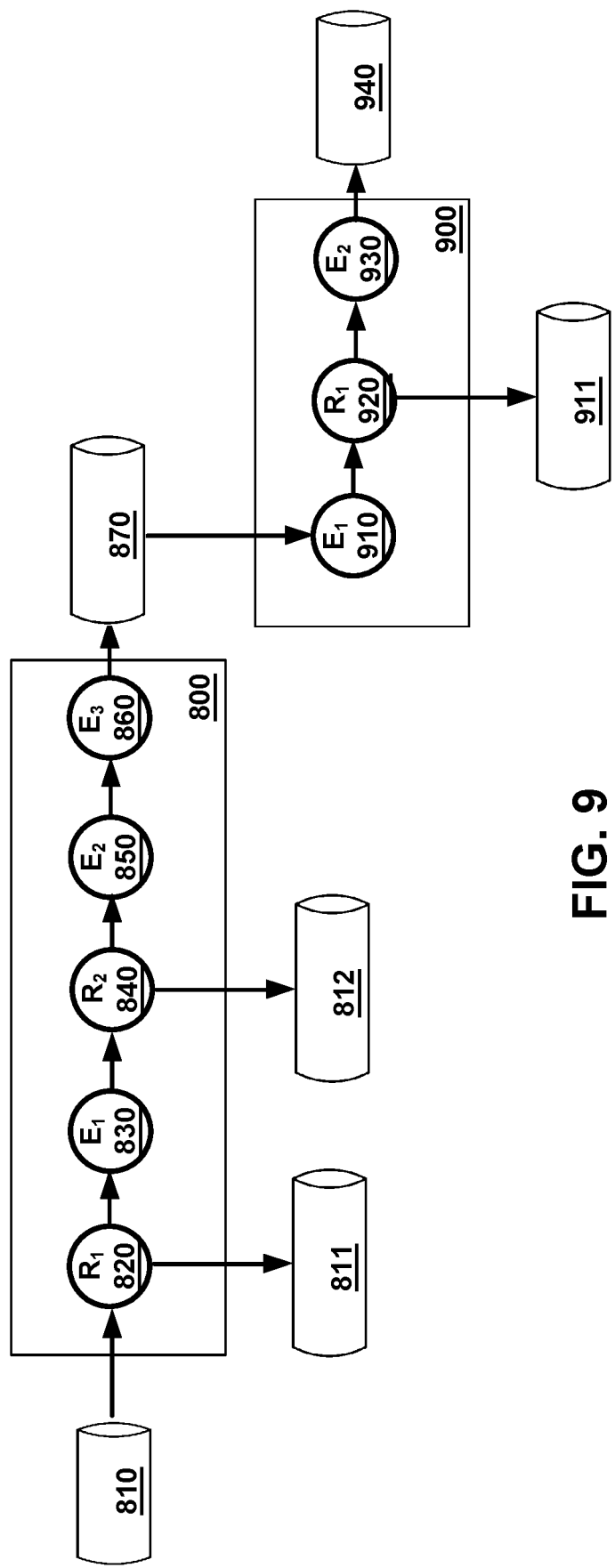
FIG. 9 depicts a flow diagram of example pipelines that may be created and deployed.

To further illustrate how a given pipeline may be configured to operate in practice, FIG. 9 illustrates yet another example involving pipeline 800, which may be interconnected with pipeline 900. For purposes of illustration, pipeline 900 may include data sink 940, and enrichers 910, 930 that are chained together with router 920 in a serial manner, such that enricher 910 is the first operator, router 920 is the second operator, and enricher 930 is the last operator in pipeline 900. Router 920 may be configured in a similar manner as router 820. As further shown in FIG. 9, data sink 870, which may take the form of a message topic, may serve as input to the first operator in pipeline 900 (i.e., enricher 910). In this respect, data sink 870 may serve as the data source for pipeline 900.

Figure 10:
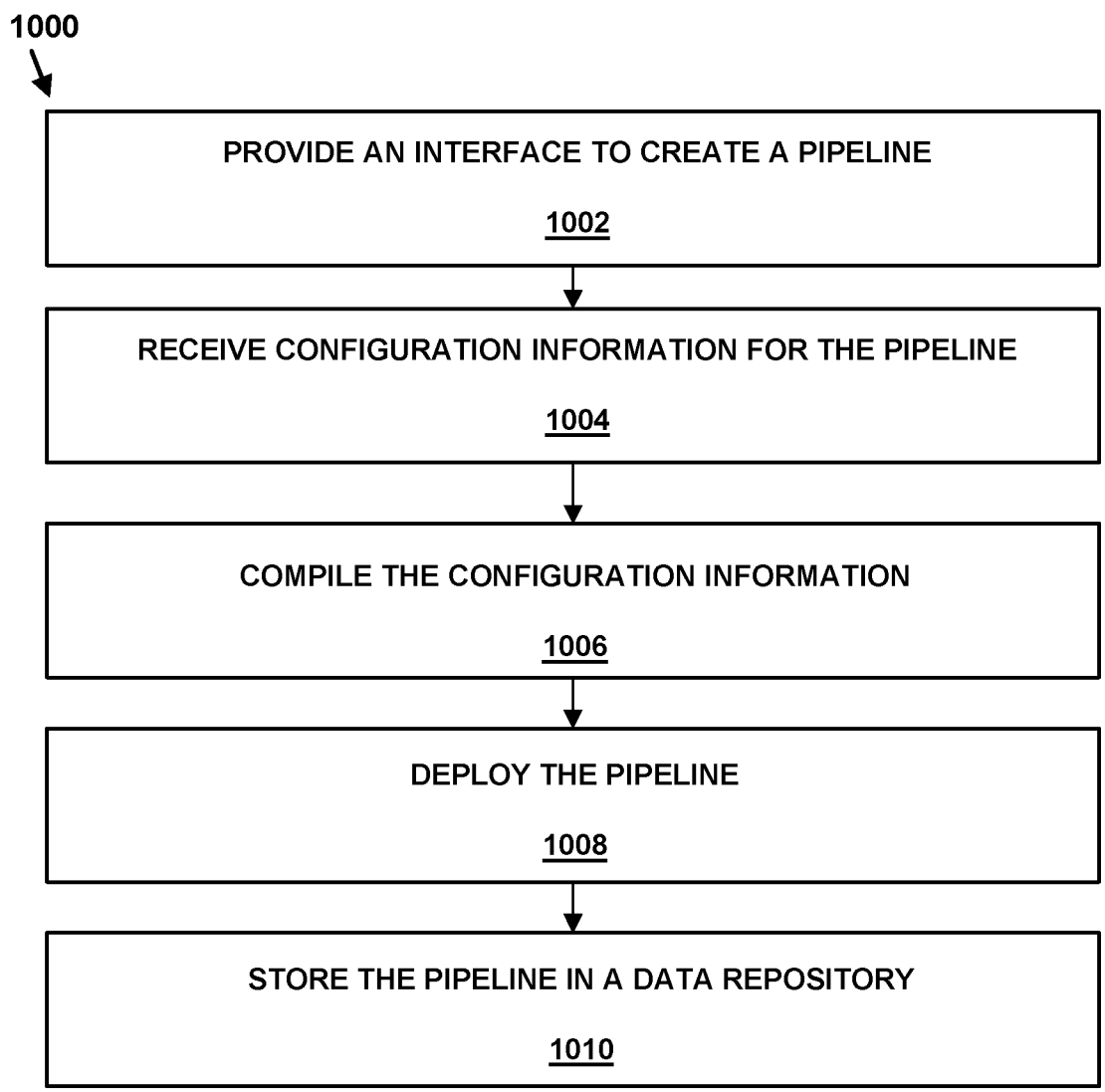
FIG. 10 depicts a flow diagram of an example method for creating and deploying one or more pipelines.

As noted above, the pipeline configuration tool may allow a user to create one or more pipelines for a given stream of data, such as a stream of messages containing operating data for an asset. FIG. 10 depicts a flow diagram 1000 of an example method for creating one or more pipelines, such as pipeline 600 of FIG. 6, pipeline 700 of FIGS. 7A-7D, pipeline 800 of FIG. 8, and/or pipeline 900 of FIG. 9.

For the purposes of explanation, these example functions are described as being carried out by asset data platform 102, but some or all of the example functions could be performed by systems other than the platform or which work in conjunction with the platform. Further, it should be understood that flow diagram 1000 is provided for sake of clarity and explanation and that numerous other combinations of functions may be utilized to create a pipeline—including the possibility that example functions may be added, removed, rearranged into different orders, combined into fewer blocks, and/or separated into additional blocks depending upon the particular embodiment.

At block 1002, the pipeline configuration tool, which may be accessed from asset data platform 102 via a client station (e.g., client station 104E or client station 106A). This interface may take various forms.

For example, the interface may include a graphical user interface (GUI) that is more targeted for everyday users of the platform (i.e., customers) and a command-line-type interface that is more targeted to advanced users. In either case, the interface for the disclosed tool may provide a user with the ability to input configuration information for a pipeline, including information that specifies a data source for the pipeline, a data sink for the pipeline, the two or more operators to be included in the pipeline, and the manner in which the two or more operators are to be chained together, among other information.

To facilitate this process, the interface may also provide a user with certain predefined options that can be selected and configured by the user, such as a list of predefined operator types (e.g., enricher types, router types, transformer types, etc.), a list of predefined data sources, a list of predefined data sinks, or the like. As previously described, the predefined operator types may be configured in various manners.

Additionally, the interface may also provide a user with an option to enable a user to track the data processing history of a datum (e.g., how a given enricher modified a stream of messages and/or where the messages were routed). The interface may provide other options as well.

At block 1004, while providing the interface for the pipeline configuration tool to a user, asset data platform 102 may receive configuration information for the pipeline. This configuration information may take various forms, examples of which may include a selection of a data source for the pipeline, a selection of a data sink for the pipeline, configuration information for each operator to be included in the pipeline, and configuration information specifying how to chain the two or more operators together. In line with the discussion above, the configuration information for each operator in the pipeline may take various forms, examples of which may include information defining the type of operator, the particular data processing operation to be performed by the operator, and the error-handling logic to be carried out by an operator, if any. The configuration information for each operator may take other forms as well.

At block 1006, asset data platform 102 may use the configuration information to create the new pipeline, which may involve compiling the configuration information (e.g., by assembling and/or transforming the configuration information into a data structure that defines the pipeline). The asset data platform 102 may compile the configuration information in various manners. As one example, asset data platform 102 may compile the configuration information into a set of configuration files (e.g., an ordered list of configuration files) that each define a respective operator within the pipeline. As another example, asset data platform 102 may compile the configuration information into a set of configuration files that each define a respective chain of operators within the pipeline. As yet another example, asset data platform 102 may compile the configuration information into a single file that defines the pipeline. The asset data platform 102 may compile the configuration information in other manners as well.

In turn, at block 1008, asset data platform 102 may deploy the pipeline. As one possibility, asset data platform 102 may deploy the pipeline within data ingestion system 302. In particular, the asset data platform 102 may deploy the pipeline as part of an enhancement stage within data ingestion system 302, which may be sequenced before or after the transformation stage of data ingestion system 302. As another possibility, asset data platform 102 may deploy the pipeline as part of another functional system of the platform, such as platform interface system 304 or data analysis system 306. Other examples are possible as well.

After the pipeline is deployed, asset data platform 102 may run the pipeline in a substantially continuous manner on streaming messages received from the given data source, which may involve applying the pipeline's sequence of data processing operations to the received streaming messages on a message-by-message basis and then outputting processed versions of the streaming messages to one or more data sinks.

Additionally, at block 1010, asset data platform 102 may optionally store the pipeline in a data repository, such as database 506. By storing the configured pipeline, the configured pipeline can later be accessed and used as a starting point for creating future pipelines with the disclosed tool.

In line with the discussion above, it should also be understood that the disclosed tool may be used to create a data processing configuration that includes two or more interconnected pipelines. For instance, instead of receiving configuration information for a single pipeline at block 1004, asset data platform 102 may receive configuration information for a data processing configuration that includes multiple pipelines—including configuration information specifying how to the different pipelines are to be interconnected with one another.

The disclosed pipeline configuration tool may thus provide several advantages over existing ETL applications (or the like) that are employed by data platforms to extract, transform, and load raw data that is received from a data source. First, the disclosed tool uses stream processing to receive, process, and output data messages in a substantially continuous manner (i.e., on a message-by-message basis), which may be more efficient than the batch processing approach used by existing ETL applications. Second, the disclosed tool may take the form of a widget or library that can be embedded into another application, which may avoid the drawbacks of integrating with a standalone ETL application. Third, the disclosed tool may allow for the creation and deployment of processing operations in a data ingestion application that are not available in existing ETL applications, including the execution of data processing operations and error-handling logic on a message-by-message basis. Fourth, the disclosed tool may allow a sequence of data process operations to be broken into separate, modular pipelines, which may allow for the data processing operations to be carried out more efficiently. It should be understood that these advantages are merely exemplary, and that the disclosed tool may provide various other advantages as well.

Although the disclosed tool has been described in the context of asset data platform 102, the disclosed tool may be used in other platforms or systems for various other use cases beyond the example embodiments described above.

VI. CONCLUSION

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:
  a network interface configured to facilitate communication with at least one data source;
  at least one processor;
  a tangible, non-transitory computer-readable medium; and
  program instructions stored on the tangible, non-transitory computer-readable medium that are executable by the at least one processor to cause the computing system to:
    provide an interface for creating a data processing pipeline;
    via the interface, receive configuration information for a given pipeline that is configured to receive streaming messages from a given data source, process each of the streaming messages, and then output a processed version of at least a subset of the streaming messages to a given data sink, wherein the given pipeline comprises a chain of two or more operators, and wherein the chain of two or more operators comprises at least one router that is configured to (i) receive a streaming message, (ii) make a decision as to whether to perform a routing operation on the received streaming message, and then (iii) output the received streaming message in accordance with that decision;

use the received configuration information to create the given pipeline; and deploy the given pipeline for use in processing streaming messages received from the given data source.

2. The computing system of claim 1, wherein the chain of two or more operators comprises at least one enricher that is configured to receive a streaming message, produce and append a given type of enrichment to the received streaming message, and then output the received streaming message with the appended enrichment.

3. The computing system of claim 1, wherein the routing operation comprises outputting the received streaming message to a data sink outside of the given pipeline instead of passing the received streaming message to the next operator in the chain of two or more operators.

4. The computing system of claim 1, wherein the routing operation comprises outputting the received streaming message to a data sink outside of the given pipeline and also passing the received streaming message to the next operator in the chain of two or more operators.

5. The computing system of claim 1, wherein the chain of two or more operators comprises at least one transformer that is configured to receive a streaming message, transform the received streaming message into a transformed version of the streaming message having a different form, and then output the transformed version of the streaming message.

6. The computing system of claim 1, wherein the streaming messages received from the given data source comprise streaming messages produced by one or more assets.

7. The computing system of claim 1, wherein the given data sink comprises a streaming message topic that serves as a data source for another pipeline.

8. The computing system of claim 1, wherein the configuration information for the given pipeline comprises a selection of the given data source, a selection of the given data sink, information defining a configuration of each operator in the chain of two or more operators, and information defining a sequence of the two or more operators in the chain.

9. The computing system of claim 1, wherein the program instructions comprise a code library that has been integrated into another application.

10. The computing system of claim 1, wherein at least one of the operators in the chain of two or more operators comprises error-handling logic.

11. A non-transitory computer-readable medium having instructions stored thereon that are executable to cause a computing system to:

provide an interface for creating a data processing pipeline;

via the interface, receive configuration information for a given pipeline that is configured to receive streaming messages from a given data source, process each of the streaming messages, and then output a processed version of at least a subset of the streaming messages to a given data sink, wherein the given pipeline comprises a chain of two or more operators, and wherein the chain of two or more operators comprises at least one router that is configured to (i) receive a streaming message, (ii) make a decision as to whether to perform a routing operation on the received streaming message, and then (iii) output the received streaming message in accordance with that decision;

use the received configuration information to create the given pipeline; and deploy the given pipeline for use in processing streaming messages received from the given data source.

12. The non-transitory computer-readable medium of claim 11, wherein the chain of two or more operators comprises at least one enricher that is configured to receive a streaming message, produce and append a given type of enrichment to the received streaming message, and then output the received streaming message with the appended enrichment.

13. The non-transitory computer-readable medium of claim 11, wherein the chain of two or more operators comprises at least one transformer that is configured to receive a streaming message, transform the received streaming message into a transformed version of the streaming message having a different form, and then output the transformed version of the streaming message.

14. The non-transitory computer-readable medium of claim 11, wherein the given data sink comprises a streaming message topic that serves as a data source for another pipeline.

15. A computer-implemented method, the method comprising:

providing an interface for creating a data processing pipeline;

via the interface, receiving configuration information for a given pipeline that is configured to receive streaming messages from a given data source, process each of the streaming messages, and then output a processed version of at least a subset of the streaming messages to a given data sink, wherein the given pipeline comprises a chain of two or more operators, and wherein the chain of two or more operators comprises at least one router that is configured to (i) receive a streaming message, (ii) make a decision as to whether to perform a routing operation on the received streaming message, and then (iii) output the received streaming message in accordance with that decision;

using the received configuration information to create the given pipeline; and deploying the given pipeline for use in processing streaming messages received from the given data source.

16. The computer-implemented method of claim 15, wherein the chain of two or more operators comprises at least one enricher that is configured to receive a streaming message, produce and append a given type of enrichment to the received streaming message, and then output the received streaming message with the appended enrichment.

17. The computer-implemented method of claim 15, wherein the chain of two or more operators comprises at least one transformer that is configured to receive a streaming message, transform the received streaming message into a transformed version of the streaming message having a different form, and then output the transformed version of the streaming message.

* * * * *